United States Patent [19]

Jannson et al.

[11] Patent Number: 5,995,742
[45] Date of Patent: Nov. 30, 1999

[54] METHOD OF RAPID PROTOTYPING FOR MULTIFACETED AND/OR FOLDED PATH LIGHTING SYSTEMS

[75] Inventors: Tomasz P. Jannson; Stephen A. Kupiec, both of Torrance; Andrew Kostrzewski, Garden Grove; Mike Rud, Sherman Oaks; Indra Tengara, Diamond Bar; Anatoly Vasiliev, Torrance; Jeongdal Kim, Los Angeles, all of Calif.

[73] Assignee: Physical Optics Corporation, Torrnace, Calif.

[21] Appl. No.: 08/900,890

[22] Filed: Jul. 25, 1997

[51] Int. Cl.$^6$ .................................................. G06F 9/455
[52] U.S. Cl. ......................................................... 395/500.42
[58] Field of Search ........................... 364/578; 345/87, 345/147; 385/146; 349/65, 61; 395/500.34, 500.35, 500.39, 500.41, 500.42

[56] References Cited

U.S. PATENT DOCUMENTS

| 5,303,322 | 4/1994 | Winston et al. | 385/146 |
| 5,680,233 | 10/1997 | Faris et al. | 349/61 |
| 5,703,621 | 12/1997 | Martin et al. | 345/147 |
| 5,838,403 | 11/1998 | Jannson et al. | 349/65 |

OTHER PUBLICATIONS

Takahashi, Nomura and Sakai, Optical System and Characteristics of an LCD Projector with Interleaved Pixels Using Four LCD Porjectors, IEEE, May 1995, vol. 5, No. 1, pp. 41–47.

Kitazawa, Shibusawa and Higuchi, Analysis of Dynamic Characteristics in a–Si TFT Structures. IEEE. Aug., 1991. pp. 89–92.

Rollins, Scrobahaci and Durbeck, Liquid A Complete Simulation System for AMLCDs, 1996 pp. 30.7.1–30.7.4.

Maximus, Vetter and Pauwels, Model for Ion Transport in AM–LCD's, Aug. 1991 pp. 53–56.

Khakzar and Lueder, Modeling of Amorphous–Silicon Thin–Film Transistors for Circuit Simulations with Spice, Jun. 1992 pp. 1428–1434.

Jannson, T. and R. Winston, "Liouville's Theorem and Concentrator Optics," *Journal of the Optical Society of America*, vol. 3, No. 1, Jan. 1986, pp. 7–8.

Jannson, Tomasz. "Radiance Transfer Function," *Journal of the Optical Society of America*, vol. 70, No. 12, Dec. 1980, pp. 1544–1549.

Jannson, T. and I. Tengara. "Radiometric Ray Tracing," *Proceedings of the 10th Symposium on Energy Engineering*, (Argonne National Laboratory, Argonne, IL, 1992), pp. 241–250.

Jannson, Tomasz, Tin Aye, and Indra Tengara. "Second–Order Radiometric Ray Tracing," *Journal of the Optical Society of America*, vol. 13, No. 7, Jul. 1996, pp. 1448–1455.

*Primary Examiner*—Kevin J. Teska
*Assistant Examiner*—Dan Fiul
*Attorney, Agent, or Firm*—Nilles & Nilles, S.C.

[57] ABSTRACT

A method of rapid prototyping a lighting system which is at least one of folded path and multifaceted includes determining output power of the lighting system by calculating phase space density. A method of rapid prototyping a lighting system comprises ray tracing the lighting system, determining photometric quantities which describe the lighting system based on the ray tracing step, and providing a stereoscopic three-dimensional rendering of the lighting system based on the determining step. The three-dimensional renderings reveal any hidden pseudo-image artifacts in a lighting system before the lighting system is actually fabricated. A computer system for rapid prototyping a lighting system comprises a plurality of slave processors networked to a host processor. The slave processor and the master processor cooperate to ray trace the lighting system, and the slave processors perform homogeneous independent tasks. The computer architecture allows the homogeneous independent tasks to be distributed to the plurality of slave computers, so that the overall amount of time required to perform the tasks is drastically reduced. The amount of computational time required to generate useful information about a prototype lighting system is thereby reduced.

17 Claims, 15 Drawing Sheets

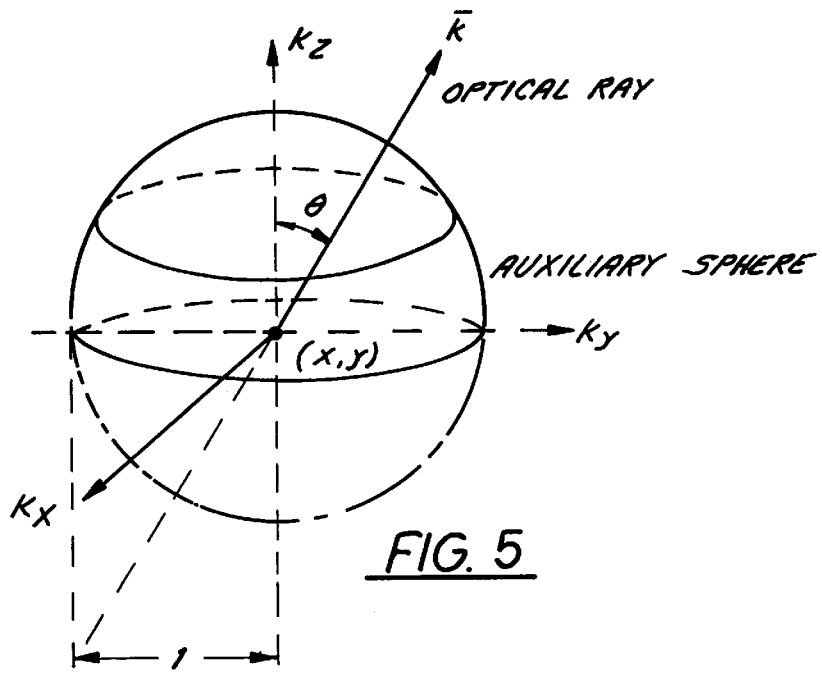
FIG. 5
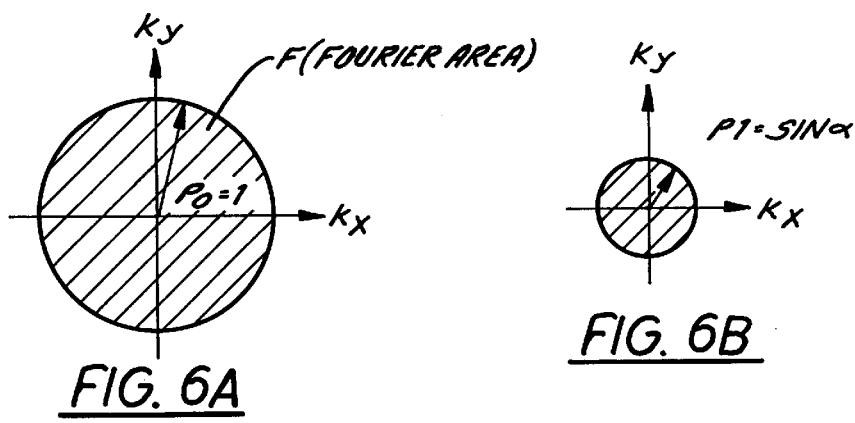
FIG. 6A
FIG. 6B
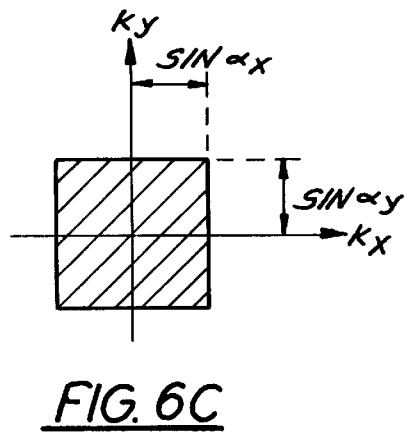
FIG. 6C
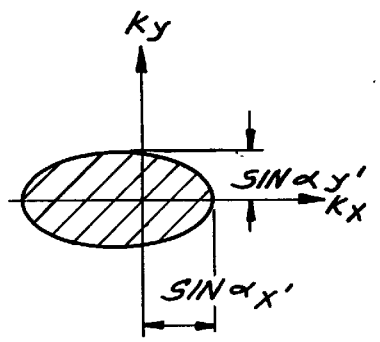
FIG. 6D

METHOD OF RAPID PROTOTYPING FOR MULTIFACETED AND/OR FOLDED PATH LIGHTING SYSTEMS

The present invention relates to methods of prototyping multifaceted and/or folded path lighting systems in which the time required to perform such prototyping is drastically reduced. Thus, the application relates to what may be termed rapid prototyping.

BACKGROUND OF THE INVENTION

Within this application, several publications are referenced by arabic numerals within parentheses. Full citations for these, and other, publications may be found at the end of the specification immediately preceding the claims. The disclosures of all these publications in their entireties are hereby incorporated by reference into the present application for the purposes of indicating the background of the present invention and illustrating the state of the art. Additionally, the disclosures of the following U.S. Patents and patent applications are hereby incorporated by reference for purposes of indicating the state of the art with respect to backlighting systems: U.S. Pat. No. 5,390,276, entitled "Backlighting Assembly Utilizing Microprisms and Especially Suitable for Use with a Liquid Crystal Display"; U.S. Pat. No. 5,359,691, entitled "Backlighting System with a Multi-Reflection Lighting Injection System and Using Microprisms"; U.S. Ser. No. 08/595,307, entitled "LCD with Light Source Destructuring and Shaping Device"; U.S. Ser. No. 08/601,133, entitled "Liquid Crystal Display System with Collimated Backlighting and Non-Lambertian Diffusing"; U.S. Ser. No. 08/618,539, entitled "Method of Making Liquid Crystal Display System"; and U.S. Ser. No. 08/782,962, entitled "Apparatus for LCD Backlighting." Finally, the disclosures of the following U.S. Patents are hereby incorporated by reference for purposes of indicating the state of the art with respect to diffuser systems: U.S. Pat. No. 5,534,386, entitled "Homogenizer Formed Using Coherent Light and a Holographic Diffuser" and U.S. Pat. No. 5,609,939, entitled "Viewing Screen Formed Using Coherent Light."

Generally speaking, multifaceted optical systems are systems in which there are a large number of small optical elements. Examples of multifaceted systems include composite mirrors and kaleidoscopes. Folded path systems are systems in which a light ray travels in multiple directions (or in a folded path), in contrast to single axis systems in which there is just one principal direction of the light beam. (The term "folded path" is used interchangeably with the term "multiaxial".) For example, a conventional periscope is multiaxial but is not multifaceted. Backlighting systems, such as those used with laptop computer screens, are both multifaceted and multiaxial.

Ray tracing is known for modeling lighting systems. A number of computer programs are available for performing such ray tracing, including Code V, OPTICAD, Radiance, and others.

Whenever performing ray tracing for lighting systems which are multiaxial or multifaceted or both, a large amount of rays is required to accurately trace the lighting system (at least 10,000 rays, and often 1,000,000 or more). The amount of computing time required by existing ray tracing programs to perform such complex ray tracing tasks is substantial. For example, in order to perform a ray tracing involving 100,000 rays, OPTICAD requires one to ten hours of computing time using a single computer.

The amount of computing time required to perform ray tracing is even greater for a substantial number of more complicated multiaxial and/or multifaceted lighting systems. Such systems include backlighting for laptop computer screens, dome lights in automobiles, and torus lighting structures used for ignition key lighting systems. All of these more complicated lighting systems require on the order of 1,000,000 rays in order to perform an accurate ray tracing. To perform such a ray tracing, about one day of computing time is required.

In nearly every industry, an emerging trend is the trend away from mass production and toward specialized product variations for individual customers. For example, in the context of backlighting systems for laptop computer-screens, each manufacturer of laptop computers is beginning to have slightly different backlighting specifications for each type of laptop computer manufactured. As a result, all types of laptop computers do not use exactly the same backlighting system. Rather, there are slight variations in terms of size and/or performance parameters of the backlighting systems. Thus, although mass production still exists, there is a move away from the "one size fits all" mentality which has characterized manufacturing and production in the past.

As a consequence of the trend towards greater product specialization, a subsidiary trend is the trend towards rapid prototyping. Prototyping is known in the context of product development for testing a product design before a product goes into mass production. Prototyping is done to ensure that the product is acceptable and will satisfactorily meet customer needs. Previously, a substantial amount of time could be devoted to the prototyping process. Once a product was developed, it was sold on a "one size fits all" basis to customers who did not ask to have products specially developed to optimally meet their special needs. With the trend toward product specialization, it is no longer acceptable to devote a substantial amount of time to the prototyping process. Product designs change rapidly and the "shelf life" of any given design tends to be shorter. From the customer's perspective, the benefits of purchasing a specially developed product as compared to an already existing product are lost if doing so results in a substantial delay due to prototyping times. Manufacturing customers have their own production schedules which must be met.

In the case of lighting systems, as is the case generally, it is necessary to prototype each product variation. This is because the product is sufficiently complex that slightly changing even just one parameter can drastically affect the overall performance of the product.

In view of the trend towards product specialization, it is apparent that the prototyping process should take as little time as possible. Consequently, for rapid prototyping, the use of ray tracing programs which take an entire day to ray trace a single lighting system prototype is unacceptable. It usually requires about one hundred separate iterations of the prototyping process to arrive at a lighting system prototype which in all respects satisfies customer needs. If it takes one day to ray trace one prototype, and if there are one hundred iterations of the prototyping process, then the resultant length of the prototyping process is at least one hundred days. This is in conflict with the basic concept of rapid prototyping, which is to provide a final design within days or weeks and not months.

Therefore, in order to make rapid prototyping possible in the context of multiaxial and/or multifaceted lighting systems, it is apparent that the amount of time required to perform one iteration of the prototyping process needs to be reduced dramatically, e.g., by a factor of one hundred. Indeed, since more than one hundred iterations are often required to produce an acceptable prototype, it is apparent that a reduction of greater than a factor of one hundred is even more desirable.

Moreover, it should also be the case that there is only one prototyping/design stage. In other words, once computer prototyping is complete, the prototype produced should satisfy customer needs in all respects. Thus, there should be only a single fabrication stage. It is undesirable to have to fabricate a physical prototype in order to learn of hidden defects, because the process of fabricating a physical prototype is time consuming and expensive as compared to computer prototyping.

Rapid prototyping thus far has not been applied to the development of lighting systems in general, and to ray tracing in particular. Existing ray tracing programs such as Code V implement very precise single ray tracing schemes. Other programs, such as Opticad and Radiance, apply conventional statistical methods (e.g., the Monte Carlo method) to implement a statistical multiray trace algorithm. All of these programs are slow and, moreover, none of these programs transfers the data which is produced into a convenient format. For example, although these programs generate ray coordinate, direction, and density information, these programs do not convert this information into photometric quantities so that the design engineer can easily assess the qualitative performance parameters of the final product. Also, there is no known method of transferring ray tracing information into three-dimensional visual imaging when the visual image surfaces are unknown. Also, there is no known method applying computer networks to ray tracing to reduce computation time.

SUMMARY OF THE INVENTION

In order to overcome these drawbacks of the prior art, the present invention provides a method of rapid prototyping a lighting system which is at least one of folded path and multifaceted including the step of determining output power of the lighting system by calculating phase space density. Preferably, output power is determined using photometric quantities (i.e., flux, ruminant intensity, luminance, and so on). Photometric quantities are preferred because, unlike radiometric quantities, they are subjective and are defined in terms of what is seen by a human eye. Luminance is the fundamental photometric quantity and can be counted directly by way of a phase space formalism described herein. Advantageously, the use of the phase space formalism promotes rapid prototyping by decreasing the amount of computational time required to generate useful information about a prototype lighting system.

According to another aspect of the invention, the present invention provides a method of rapid prototyping a lighting system, the method comprising the steps of ray tracing the lighting system, determining photometric quantities which describe the lighting system based on the ray tracing step, and displaying a stereoscopic three-dimensional rendering of the lighting system based on the determining step. Advantageously, a three-dimensional rendering promotes rapid prototyping by revealing any hidden pseudo-image artifacts in a lighting system before the lighting system is actually fabricated.

According to yet another aspect of the invention, a computer system for rapid prototyping a lighting system comprises a plurality of slave processors networked to a master processor, the slave processor and the master processor cooperating to ray trace the lighting system, the slave processors performing substantially homogeneous independent tasks. Advantageously, the computer architecture allows the homogeneous independent tasks to be distributed to the plurality of slave processors, so that the overall amount of time required to perform the tasks is drastically reduced. Again, this promotes rapid prototyping by decreasing the amount of computational time required to generate useful information about a prototype lighting system.

According to still another aspect of the invention, a light pipe comprises a plurality of microprisms separated by a plurality of spaces, the microprisms being metallized and the plurality of spaces being non-metallized. Advantageously, within the light pipe, propagation of light is governed by total internal reflection and redirection of light is governed by the metallizations. Thus, losses due to metal absorption are minimized yet flexibility in microprism geometry is maximized, and the number of system modules is minimized.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIG. 5 illustrates localization of a ray in phase space;

FIGS. 6A–6D illustrate luminance characteristics in phase space for various types of light sources;

DETAILED DESCRIPTION OF THE PREFERRED EMBODIMENT

Figure 1:
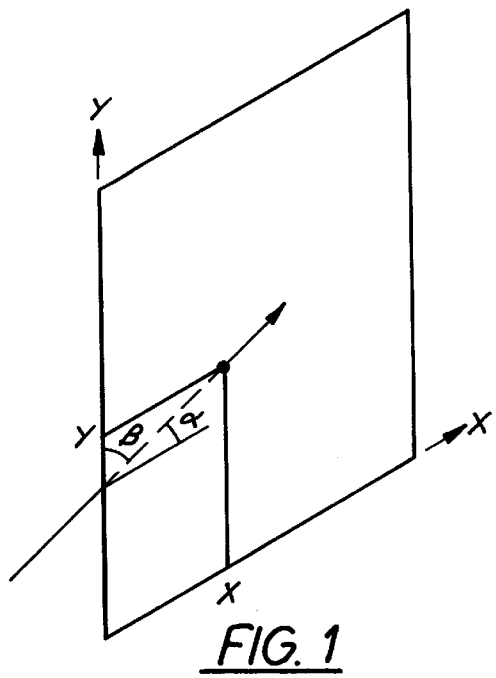
FIG. 1 illustrates the intersection of a ray with a two-dimensional plane.

I. Rapid Prototyping Through Photometric Ray Tracing and Four-Dimensional Phase Space In this section, a phase-space formalism is applied to ray-tracing modeling of photometric quantities, such as luminance (radiance), intensity (emissivity), luminant (radiant) intensity, and flux (power). Photometric ray tracing facilitates the provision of input ray-tracing based on quasi-homogeneous source optical intensity and spatial coherence. As described below, the photometric ray tracing model may be expanded to a four-dimensional (4-D) phase-space defined by spatial coordinates (x,y) and directional unit vector coordinates $((k_x, k_y, k_z)$ where $k_x^2+k_y^2+k_z^2=1)$. While the spatial coordinates (x,y) define spatial area, the directional coordinates $(k_x,k_y)$ define so-called Fourier (directional) area.

The fundamental connection between photometric quantities and 4-D phase space is based on the fact that luminance (radiance) is a 4-D phase-space density. Thus, an arbitrary bundle of rays passing through a given plane (x,y) can be presented as a multiplicity of points in phase space (i.e., a single ray is represented isomorphically by a single point in phase space). In particular, a Lambertian source is represented by uniform 4-D distribution in phase space.

The basic physical quantity in photometry is luminance in $Cd/m^2$. The invention could also be used in conjunction with the equivalent physical quantity in radiometry, that is, is brightness (radiance) in $W/m^2$ster. Similarly, luminant intensity could be replaced in radiometry by radiant intensity, flux by power, etc. The invention is explained in terms of photometric units since photometric units are preferred.

The fundamental relation between luminance and phase-space density, or 4-D ray density, can be applied to evaluate photometric quantities by numerically calculating a number of rays passing through selected phase-space domains. For example, luminance can be calculated as a number of rays located in the phase-space elementary cell defined by Heisenberg's uncertainty relation. Emissivity, on the other hand, can be calculated by integrating elementary cells through directional vector space $(k_x, k_y)$. As a result, the described formalism allows precise connection of Monte-Carlo ray-tracing for a multiplicity of rays, with basic photometric (radiometric) quantities.

A. Description of Ray Path Using Four-Dimensional Phase Space

For any given plane (physical or non-physical), there are a plurality of rays passing through the plane. The rays passing through the plane intersect the plane at different coordinates and in different directions. Each ray passing through the plane can be uniquely described by the four coordinates (x, y; $k_x$, $k_y$) where x, y is the point of intersection with the plane, and $k_x$, $k_y$ is the directional cosine describing the direction of the ray at the point of intersection. The totality of these rays can be described by a full set of coordinates (x, y; $k_x$, $k_y$). The coordinates (x, y; $k_x$, $k_y$) describe a four-dimensional phase space.

Direction and location are therefore in the same four-dimensional space. This coordinate system abstracts away from subjective observation.

Referring to FIG. 1, the intersection of a ray through a given plane is illustrated. The intersection of the ray is uniquely described by the spatial coordinates x and y (which describe the point in the plane which intersects the ray) and the directional cosine $k_x$ and $k_y$ (which describe the angle at which the ray intersects the plane).

The ray has a angle a with respect to the x axis, and angle β with respect to the y axis, and an angle θ with respect to the Z axis. The above-described parameters are related as follows:

$$\cos^2 \alpha + \cos^2 \beta + \cos^2 \theta = 1 \quad (1\text{-}1)$$

$$k_x^2 + k_y^2 + k_z^2 = 1 \quad (1\text{-}2)$$

$$k_x = \cos \alpha \quad (1\text{-}3a)$$

$$k_y = \cos \beta \quad (1\text{-}3b)$$

$$k_z = \cos \theta \quad (1\text{-}3c)$$

The totality of the rays passing through the plane is described by the full set of spatial coordinates (x, y) and directional coordinates ($k_x$, $k_y$).

The coordinates $k_x$ and $k_y$ are unit vector components. Since there are three directional cosine unit vectors ($k_x$, $k_y$, $k_z$), and the sum of the squares is equal to 1, there are only two degrees of freedom. Therefore, the direction of the ray may be uniquely described by the directional cosine coordinates $k_x$ and $k_y$.

The spatial coordinates alone are not enough to describe the intersection of the ray. Two rays could intersect a plane at the same point but not in the same direction. In this case, the cartesian coordinates are the same, however, the directional coordinates are different.

Figure 2:
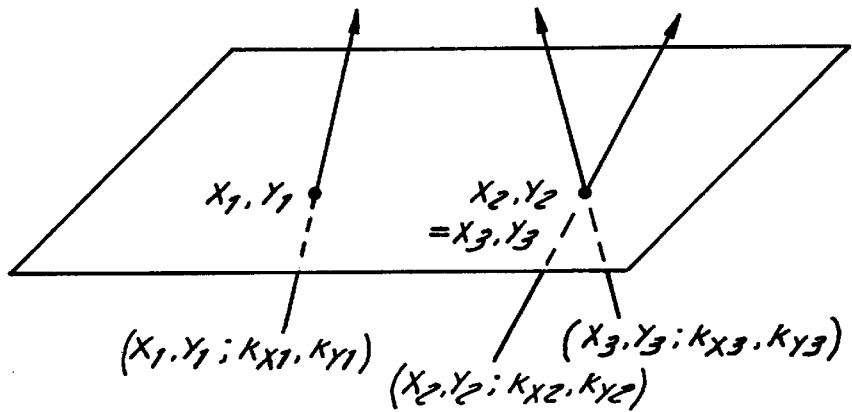
FIG. 2 illustrates the intersection of a plurality of rays with a two-dimensional plane.

Referring to FIG. 2, three rays which intersect an x, y plane are illustrated. The first ray has coordinates ($x_1$, $y_1$; $k_{x1}$, $k_{y1}$). The second ray has coordinates ($x_2$, $y_2$; $k_{x2}$, $k_{y2}$). The third ray has coordinates ($x_3$, $y_3$; $k_{x3}$, $k_{y3}$). The second and third rays have the same spatial coordinates (i.e., $x_2=x_3$ and $y_2=y_3$) but have different directional coordinates. Therefore, they are in a different location in four-dimensional phase space.

In this four-dimensional coordinate system, each ray has a unique location. Even though the second and third rays intersect the x, y plane at the same location, they are still in a different location in the directional coordinate space, because their directional coordinates are different. Only two identical rays (identical location and direction) have the same point in the 4-D phase space.

Figure 3:
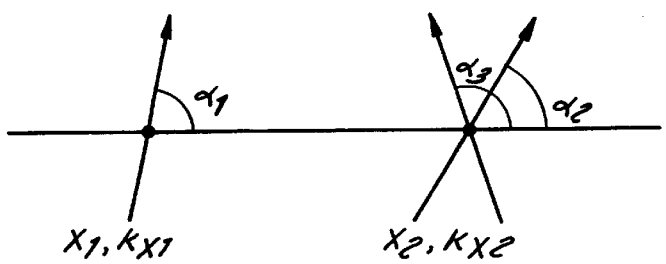
FIG. 3 illustrates the intersection of a plurality of rays with a line.

Referring to FIG. 3, the four-dimensional phase space diagram of FIG. 2 is reduced to a two-dimensional diagram by setting y=0 and $k_y$=0 for each of the three rays. This reduction to two-dimensional space is performed because it is impossible to illustrate four-dimensional space.

Figure 4:
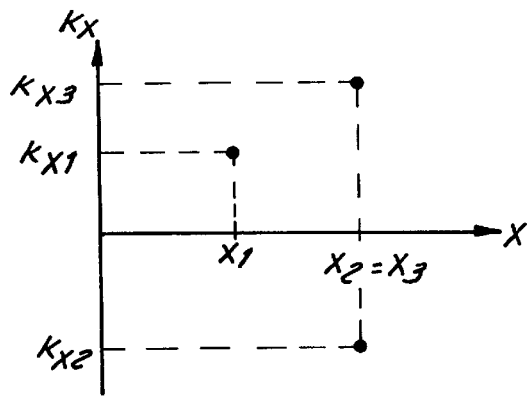
FIG. 4 illustrates a two-dimensional mapping of the rays illustrated in FIG. 3.

Referring to FIG. 4, a two-dimensional mapping of the rays in FIG. 3 is illustrated. The second and third rays have the same coordinate along the x axis, but have different coordinates along the $k_x$ axis. The second ray has a negative coordinate along the $k_x$ axis, because the second ray tilts to the left, whereas the third ray has a positive coordinate along the $k_x$ axis, because the third ray tilts to the right.

Of course, in an actual lighting system, there are on the order of ten thousand to ten million rays. Computing the path of each ray individually is computationally prohibitive. However, a density (rays per surface unit) of the rays can be determined. The total surface area of the output plane of the lighting structure is subdivided so that given a total number of rays and a total surface area, we arrive at a density of rays per surface unit. Since the total number of rays passing through a plane is proportional to power (in either subjective or objective units), this density of rays in four-dimensional space can be connected with luminance or brightness, as described below.

The analysis of a lighting system using phase space is easily performed because most existing ray tracing programs output spatial and directional information. However, no existing ray tracing program combines spatial and directional information into a single coordinate system in the manner described. Nevertheless, phase space analysis is easy to implement in conjunction with existing ray tracing programs.

B. Luminance as Phase-Space Density

For purposes of photometric ray tracing, three basic photometric quantities (flux (P), luminant intensity (J), and luminance (B)) are defined with respect to 4-D phase-space (x,y; $k_x$, $k_y$), where (x,y) are spatial coordinates of a given plane (physical or not), and ($k_x$,$k_y$) are directional coordinates of directional cosine space, with a directional unit vector, $\vec{k}$, and directional cosines ($k_x$, $k_y$, $k_z$):

$$\vec{k} = (k_x, k_y, k_z) = (\vec{p}, k_z); \quad \vec{p} = (k_x, k_y); \quad |\vec{k}| = k = 1 \quad (2\text{-}1)$$

as shown in FIG. 5, which illustrates localization of a ray in phase space.

Using the phase-space notation, the basic photometric quantities can be defined through a number of equivalent equations:

$$P = \iint B \cos \theta \, dA \, d\omega \quad (2\text{-}2a)$$

$$P = \iiiint B(x,y; k_x, k_y) \, dx \, dy \, dk_x \, dk_y \quad (2\text{-}2b)$$

$$P = \iint B k_z \, dA \, d\omega \quad (2\text{-}2c)$$

$$P = \int E \, dA \quad (2\text{-}2d)$$

$$P = \int J \, d\omega \quad (2\text{-}2e)$$

$$P = \int B \, d\Omega \quad (2\text{-}2f)$$

$$P = \int J \, d\omega \quad (2\text{-}2g)$$

$$J = \cos \theta \int B \, dA \quad (2\text{-}3)$$

$$E = \int B \cos \theta \, d\omega = \iint B \, dk_x \, dk_y \quad (2\text{-}4)$$

where $d\omega$ is a solid angle element, $d\Omega = dA \, dk_x \, dk_y$, $d\Omega$ is a throughput (phase space) element, and $dA = dx \, dy$.

Equation (2-2a) is the classical formula for power defined as a function of brightness and solid angle. Equation (2-2b) defines power in terms of brightness as a function of phase space coordinates. Importantly, from this equation, it should be apparent that luminance (i.e., B(x,y;$k_x$,$k_y$)) is equal to phase space density. As a result, phase space density integrated over the four coordinates (dx, dy; $dk_x$, $dk_y$) yields flux (power).

For purposes of assisting understanding, the second relation Eq. (2-2b) can be compared to the more common equation for mass:

$$M = \iiint \rho(x,y,z) \, dx \, dy \, dz \quad (2\text{-}2b')$$

In this equation, the mass density is $\rho(x,y,z)$. When this parameter is integrated over the volume element dx, dy, dz, mass is obtained.

Similarly, when Eq. (2-2b) is integrated over dx, dy, $dk_x$, $dk_y$, the total number of rays passing through the X-Y plane is obtained. From Eq. (2-2b), it follows that the number of rays is proportional to brightness. This is a very powerful tool which avoids the necessity to count rays individually. The number of rays is identified with photometric quantities by way of Eq. (2-2b).

Equation (2-2c) is identical to the first formula, except that the $\cos \theta$ term has been replaced by $k_z$. This can be done because $\cos \theta$ is the directional cosine in the Z direction (i.e., $k_z = \cos \theta$).

Equation (2-2d) defines power as a function of emittance. To arrive at Eq. (2-2d), the integration over direction ($dk_x$, $dk_y$) has already been performed. Emittance is lumen per square meter, and is equal to the number of rays passing through the x-y plane per unit area.

Equation (2-2e) includes the integration over dx, dy and includes a multiplication by $\cos \theta$. Equation (2-2e) is obtained by substituting Eq. (2-3) into the right-hand side of Eq. (2-2a).

The throughput of the system, $\Omega$, is:

$$\Omega = \iiiint dx \, dy \, dk_x \, dk_y = \int \cos \theta \, d\omega \, dA. \quad (2\text{-}5)$$

With reference to the above comparison to mass, throughput is analogous to the volume unit $\iiint dx \, dy \, dz$. The $dx \, dy \, dk_x \, dk_y$ term is the elementary phase space volume limit. (The term "volume" is used in the mathematical sense, not in the physical sense.)

It should be emphasized that the measurement plane (x,y) can be either a source (emitter) plane or receiver plane, or any other plane of interest, physical or not. In the case of the Lambertian plane (x,y), a luminance, B, is constant over the entire plane in both spatial and directional coordinates.

In such a case, Eq. (2-3) and Eq. (2-4) reduce to (Lambert's Law):

$$B(x,y;k_x,k_y) = B_o = \text{constant}. \quad (2\text{-}6)$$

$$J = B \Delta A \cos \theta = J_o \cos \theta. \quad (2\text{-}7)$$

where $J_o = B_o \Delta A$, and $$E = B \Delta \Omega = \pi B. \quad (2\text{-}8)$$

Since the entire throughput, equivalent to a half-full solid angle (2π), is equal to π; also, $$P = B \Delta \Omega. \quad (2\text{-}9)$$

From Eq. (2-5), the fundamental relation between the elementary throughput and solid angle may be obtained.

Therefore, there are two possible relations defining the luminance:

$$d\Omega = \cos\theta \, d\omega \, dA \tag{2-10}$$

$$B = \frac{J}{\cos\theta \Delta A} = \frac{J}{\Delta A_{\|}}, \tag{2-11}$$

or $$B = \frac{E}{\Delta k_x \Delta k_y} = \frac{E}{\cos\theta \Delta \omega} \tag{2-12}$$

In the first relation, Eq. (2-11), $\cos\theta$ has been attached into surface element $\Delta A$ (thus creating surface-normal element $\Delta A_{\|}$), while in the second relation, Eq. (2-12), $\cos\theta$ has been attached into a solid angle element. Although typically, the approach of Eq. (2-11) is used, the more convenient approach in the present circumstances is to use Eq. (2-12). This is because of the definition of luminance, as phase-space density; $\rho$: $\rho(x,y; k_x, k_y)$ or, $$P = \int\int\int\int \rho(x, y; k_x, k_y) dx \, dy \, dk_x \, dk_y \tag{2-13a}$$

$$= \int\int\int\int B(x, y; k_x, k_y) dx \, dy \, dk_x \, dk_y,$$

$$\rho(x,y;k_x,k_y) = B(x,y;k_x,k_y) \tag{2-13b}$$

(where $d\Omega = dx \, dy \, dk_x \, dk_y$ is the phase-space elementary volume) can be applied to photometric ray tracing in a most direct way.

As mentioned above, in the case of a lambertian plane, the luminance B is constant over the entire plane is both spatial and directional coordinates. The rays are therefore uniformly distributed in both spatial and directional coordinates.

All light sources (except for lasers) are lambertian. Therefore, if the output power of a light source is known, the ray distribution may be easily determined. The brightness information can be easily converted to a distribution of rays. The same is true for other planes (physical or nonphysical) in the lighting system.

The following equations repeat the definition of the elementary four-dimensional volume unit $d\Omega$, and define spatial and directional area.

$$d\Omega = dx \, dy \, dk_x dk_y \tag{2-14a}$$

$$dx \, dy = \text{elementary spatial area} \tag{2-14b}$$

$$dk_x dk_y = \text{elementary Fourier (directional) area} \tag{2-14c}$$

The maximum (non-elementary) Fourier area occurs when $k_z$ equals 0. In this case, the Fourier area ($k_x, k_y$) is equal to $\pi$. Therefore, for any direction ray, the coordinates ($k_x, k_y$) of the ray will always be within the unit circle on the $k_x, k_y$ plane. Moreover, since the source is lambertian, the directional coordinates of all rays are equally distributed within the $k_x, k_y$ unit circle. This is the fully lambertian case and corresponds to FIG. 6A.

Referring now to FIG. 6B, the limited lambertian case is illustrated. In this case, the distribution is still uniform, but the area is limited because the radius is smaller than 1. In this case, the rays are uniformly distributed but only in a limited range of directions. Thus, in both FIGS. 6A and 6B, the sources are isotropic and lambertian, but in FIG. 6B, the source is only limited lambertian.

Referring now to FIGS. 6C and 6D, anisotropic cases are illustrated. In this case, that the distribution of the directions of the rays is not the same in each direction.

It is seen that, according to FIGS. 6A–6D, the Fourier area parameters are as follows:

| Case 6A: | Lambertian, | $F^{(a)} = \pi$ | (2-10(a)) |
| Case 6B: | Limited-Lambertian, | $F^{(b)} = \pi \sin^2 \alpha$ | (2-10(b)) |
| Case 6C: | Rectangular-Anisotropic, | $F^{(c)} = \pi \sin\alpha_x \sin\alpha_y$ | (2-10(c)) |
| Case 6D: | Elliptical-Anisotropic, | $F^{(d)} = \pi \sin\alpha_x \sin\alpha_y$ | (2-10(d)) |

Although result (2-10(a)) can be also obtained by applying Eq. (2-5), here, it is obtained much more easily.

C. Lambertian Sources and Photometric Ray Tracing

Figure 7:
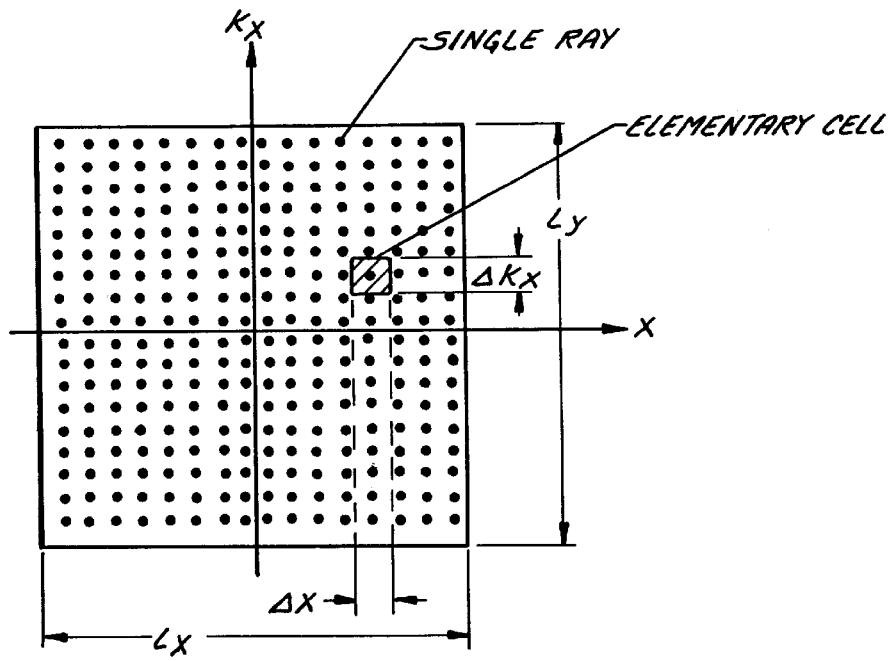
FIG. 7 illustrates uniform luminance distribution at a Lamerbtian-source straight line segment in 2-D phase space.

Referring now to FIG. 7, a 2-D phase-space illustration of a uniform luminance distribution at a Lambertian-source straight line segment is illustrated. The Lambertian source has a length $L_x$, full directional angle ($k_{x_{max}} = \pm 1$), and an elementary cell ($\Delta x, \Delta k_x$).

Figure 8A:
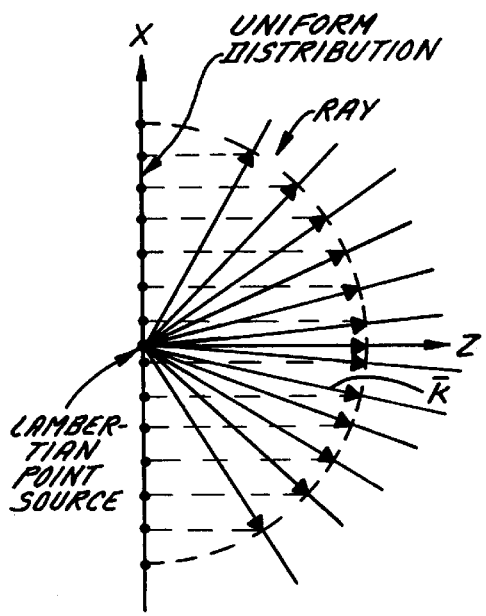
FIGS. 8A and 8B compare a Lambertian point source and a uniform point source using photometric ray tracing.

In the case of a lambertian source, according to Eq. (2-6), the luminance must be constant in the phase-space. On the other hand, each optical ray, as shown in FIG. 7, is represented by a single and unique point in the 4-D phase space, and phase space density, $\rho$, remains invariant for lossless optical systems, according to the optical Liouville theorem [4-6]. It is not possible to illustrate 4-D space. Therefore, the luminance point representative is illustrated using only 2-D phase space $(x, k_x)$. In FIG. 8A, a 2-D luminance distribution at a Lambertian source straight line is illustrated. According to Lambertian law[7] however, it must be uniform, with an elementary cell ($\Delta x, \Delta k_x$).

Figure 8B:
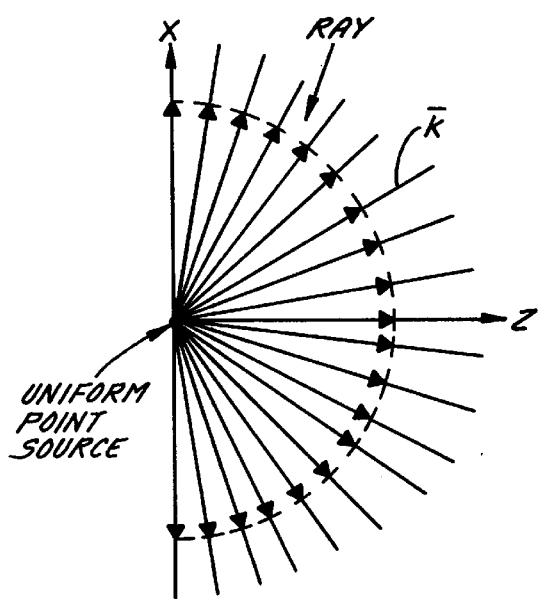

To transform the uniform phase-space distribution, as in FIG. 7, into regular ray tracing, the Lambertian point source in FIG. 8A is considered. It is seen that $\vec{k}$-distribution is uniform in directional ($k_x$) space, and is not in angular space (so, $J = J_o \cos\theta$). Quite the opposite, the uniform angular distribution, as in FIG. 8B, does not represent a Lambertian source. FIG. 8A corresponds to a lambertian light source in which brightness is uniform, and FIG. 8B corresponds to a light source in which radiant intensity is uniform.

This can be more readily understood from the following table.

TABLE 1

| $k_x = \cos\alpha = \sin\alpha_x$ | $\alpha_x$ |
|---|---|
| 1.0 | 90° |
| .8 | 53° |
| .6 | 37° |
| .4 | 24° |
| .2 | 11.5° |
| 0 | 0° |

As can be seen from Table 1, uniform distribution along the $k_x$ axis does not result in uniform angular distribution. For example, the angular difference between $k_x = 0.8$ and $k_x = 1.0$ is 37 degrees, whereas the angular difference between $k_x = 0$ is only 11.5 degrees. Unexpectedly, therefore, a lambertian point source does not have a uniform distribution of rays when plotted in spatial coordinates, as illustrated in FIG. 8A.

Figure 9:
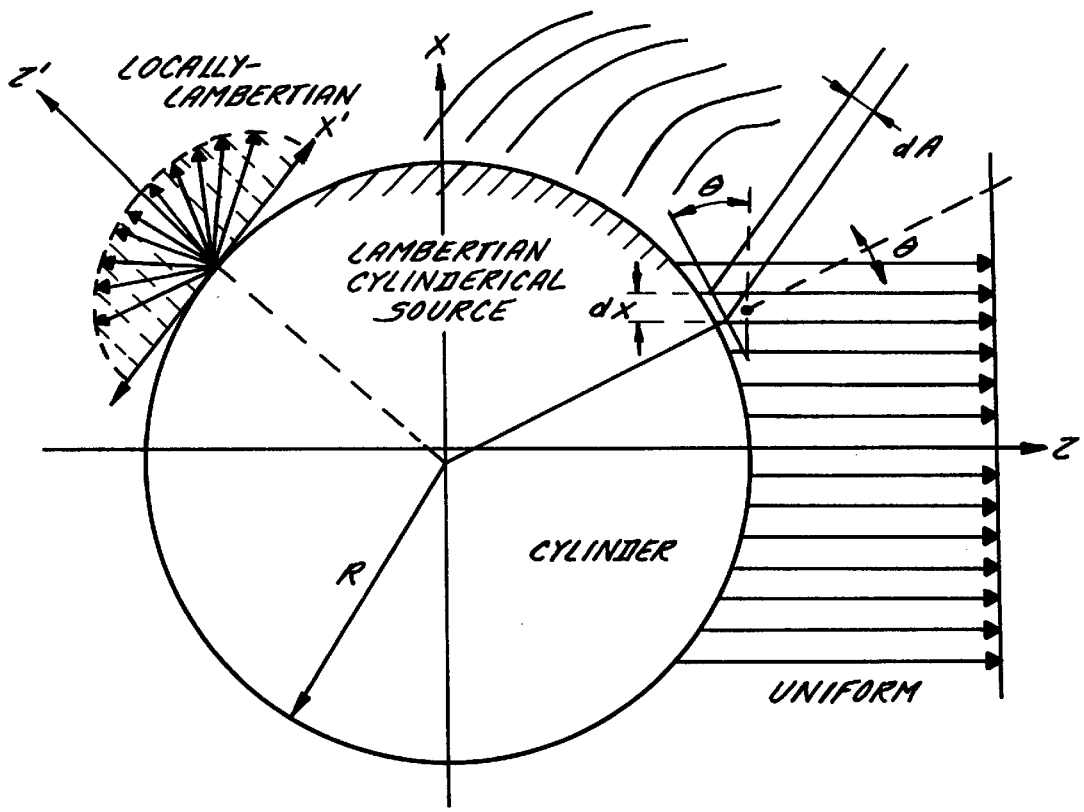
FIG. 9 illustrates a Lambertian cylindrical source using photometric ray tracing.

The above findings can be expanded into cylindrical Lambertian sources. These sources have many practical applications, such as fluorescent sources. It is seen in such a case, the source is locally-Lambertian, and, in spite of a surface curvature, the Laminent Intensity is constant in a given direction. (Therefore a difference between such Lambertian cylindrical source and a Lambertian flat source cannot be recognized [7].) For example, the sun and the moon are lambertian spherical sources. As a consequence, both are observed as a lambertian flat disc. Indeed, according to FIG. 9, the flux element in z-direction, or Luminant Intensity element is, according to Eq. (2-7), proportional to the surface element dA, and cos θ:

$$dJ_o = B \cos \theta dA \tag{3-1}$$

but according to FIG. 9, $$dx = dA \cos \theta. \tag{3-2}$$

Thus, $$dJ_O = \frac{B\cos\theta dx}{\co j\theta} = Bdx \tag{3-3}$$

is uniform, as a function of x.

D. Photometric Ray Tracing and Photometric Quantities

In order to present photometric quantities in terms of rays' number density, Eq. (2-2) is quantized in the form:

$$P = \int\int\int\int B(x,y;k_x,k_y) dx\, dy\, dk_x\, dk_y \simeq \sum_i \sum_j \sum_k \sum_l B_{ijkl} \Delta \Omega_{ijkl} \tag{4-1}$$

where $B_{ijkl}$ is the average luminance value within the elementary four-dimensional cell $\Delta\Omega$, in the form:

$$\Delta\Omega_{ijkl} \triangleq (x_i, x_i+\Delta x; y_j, y_j+\Delta y; k_{x_k}, k_{x_k}+\Delta k_x; k_{y_l}, k_{y_l}+\Delta k_y), \tag{4-2}$$

and $$\Delta\Omega = \Delta x \Delta y \Delta k_x \Delta k_y \text{ where } \Delta x \Delta y \Delta k_x \Delta y \text{ is the phase-space elementary volume} \tag{4-3}$$

By applying the quantization rule, the following relation is obtained:

$$P \rightarrow N, \quad B_{ijkl} \rightarrow n_{ijkl} \tag{4-4(ab)}$$

where N is the total number of rays, and $n_{ijkl}$ is a number of rays passing the elementary cell $\Delta\Omega(i,j,k,l)$. In other words, since each ray passing a given plane (x,y) is represented by a single point in 4-D phase-space, $n_{ijkl}$ is a number of ray points inside the elementary cell. Analogously, other photometric quantities in terms of numbers of rays can be presented, such as emittance:

$$E_{i,j} = \sum_k \sum_l B_{ijkl} \Delta k_{x_k} \Delta k_{x_l} \tag{4-5(a)}$$

$$N_{i,j} = \sum_k \sum_l n_{ijkl} \Delta k_{x_k} \Delta k_{y_l} \tag{4-5(b)}$$

Figure 10:
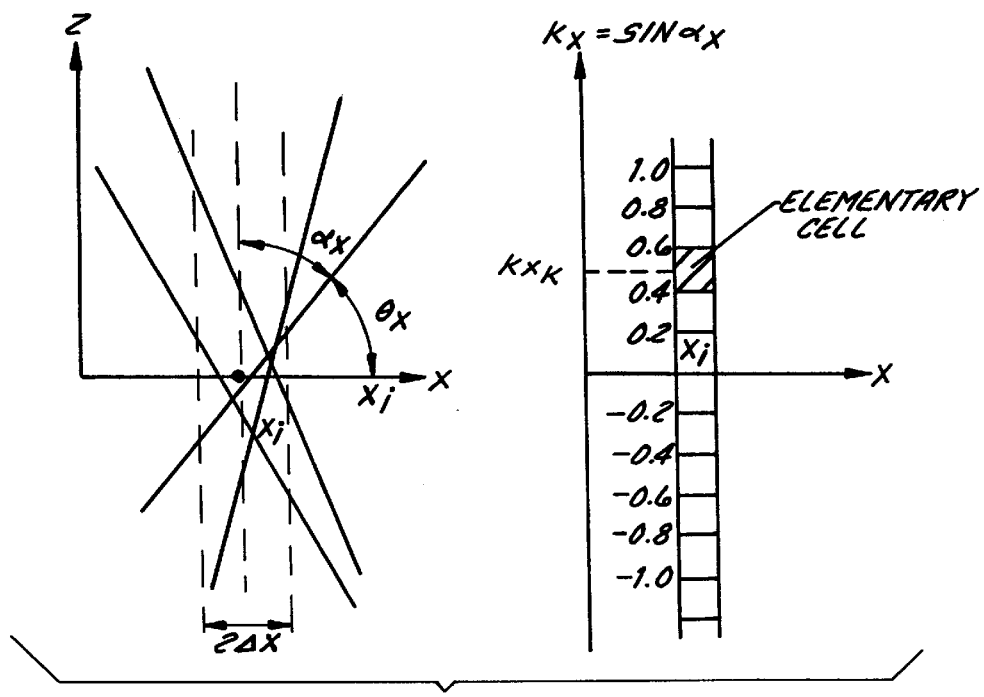
FIG. 10 illustrates a set of rays with various directional cosine and a representation of the rays in 2-D phase space.

This relation is illustrated in FIG. 10, for the 2-D case, where there are a set of rays passing the same segment, but with various directions. Those rays, represented by points in phase-space, are then localized within elementary cells, with the same x-coordinate. Then, a number of ray points is counted, in each elementary cell (ijkl), and these numbers are summated along a phase-space vertical i-th column. The sum of all rays in this column is equal to a number $N_{ij}$, according to Eq. (4-2).

The number of applied rays is arbitrary, but to avoid prohibitively long computing time, cannot be too large. Also, to guarantee smooth integration, the number should not be too small (preferably $n_{ijkl} \sim 10$).

E. Utilization of Phase Space Formalism to Rapidly Predict Output Power

Figure 11:
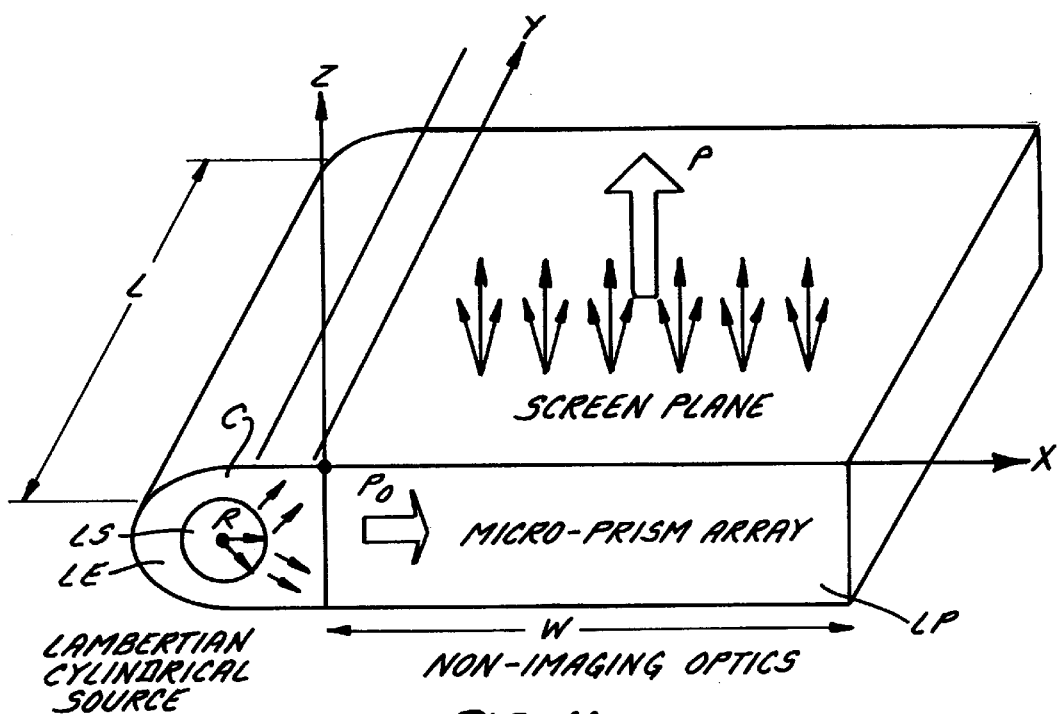
FIG. 11 illustrates a backlighting system with a Lambertian source, non-imaging optics, microprism array and output.

Referring now to FIG. 11, a backlighting system is illustrated. The backlighting system, which is typical of those used in laptop computers, comprises a light engine LE, a light pipe LP, and a screen output plane. The light engine LE includes a lambertian cylindrical light source LS and a collimator C. The light pipe LP has a microprism array on its bottom which directs light from the light engine LE to the output plane. There is a spatial light modulator (SLM) on top of the output plane which modulates the light from the output plane based on signals representing information to be presented to the user. Optionally, there may also be a diffuser on the top surface of the SLM, a film between the light engine LE and the light pipe LP, and a film underneath the SLM.

Initially, it should be noted that, for rapid prototyping purposes, each of these modules is analyzed separately. This is because it is usually the case that only one module is modified at a time. As a result, in the event of a design change, it is necessary only to reanalyze the modified module, and the existing analyses for the unchanged modules may be re-utilized. Advantageously, the fact the existing analyses are re-utilized saves computer time, thereby promoting rapid prototyping.

The phase space formalism described above can be used to rapidly predict output power of one of the elements of the backlighting system, for example, the light pipe. The steps of the process are as follows. First, the dimensions of a hypercube are defined. A hypercube is a four dimensional cube and is the elementary cell in the four dimensional phase space coordinate system. To define the hypercube, it is first noted that the x, y plane has a defined range of x values and y values, and that the directional cosine $k_x$ and $k_y$ both vary from +1 to -1. Thus, all of the possible values of x, y, $k_x$ and $k_y$ are known. Next, the hypercube is divided into uniform elementary cells (see Eq. 4-2). Then, a total number of rays and total number of cells is assumed. The total number of rays and total number of cells are chosen so that at least a few rays (preferably about six to eight rays) pass through each elementary cell. It has been found that a number of rays in the range of 100,000 to 1,000,000 in conjunction with a total number of cells in the range of about 10,000 works well. Finally, the relation that luminance is equal to phase space density is applied to predict output power. The following examples are illustrative of this process and explain this process in greater detail.

EXAMPLE I

In the numerical example presented, the following parameters are assumed: a lamp luminance, $B_o=39,000$ cd/m² (lambertian); source diameter D=2R=2 mm; source length L=30 cm. Then, incident flux is $P_o$=(surface area of cylinder source) (lamp luminance) (Fourier area for fully lambertian source)

$$P_o = \pi \times D \times L \times B_o \times \pi = \pi^2 \times 2 \text{ mm} \times 30 \text{ cm} \times 39,000 \text{ cd/m}^2 = \pi^2 \times 0.002 \text{ m} \times 0.3 \text{ m} \times 39,000 \text{ cd/m}^2 = 231 \text{ lm} \tag{5-1}$$

Next, a weight (lumens/ray) is attached to each ray. If it is assumed that this input power is equivalent to the total number of 100,000 rays (i.e., $N_o=100,000$), the following ray density is obtained:

$$d = \frac{P_O}{N_O} = \frac{231 \text{ lm}}{100,000} = 0.00231 \text{ lm/ray} \tag{5-2}$$

According to Eq. (5-2), a power factor is attached to each ray. The ray goes through many interfaces, as determined by a conventional ray tracing program. At each interface, there are material losses, such as reflection losses. But due to the fact that a weight is attached to each ray, the weight can be reduced according to these losses. For purposes of illustration, statistical averaging can be utilized.

Next, it is assumed that the optical efficiency of the system is as follows:

$$\eta = \frac{P}{P_O} = 70\% \tag{5-3}$$

Then, N=70,000 rays passes into the end (it is assumed that each ray either experiences 100% loss or 0% loss), and output power is as follows:

$$P=\eta P_o = 162 \text{ lm, with } 0.002 \text{ lm/ray} \tag{5-4}$$

Next, it is assumed that L=W=30 cm, and a total number of elementary cells is $$M=10\times10\times10\times10=10^4 \tag{5-5}$$

Figure 12:
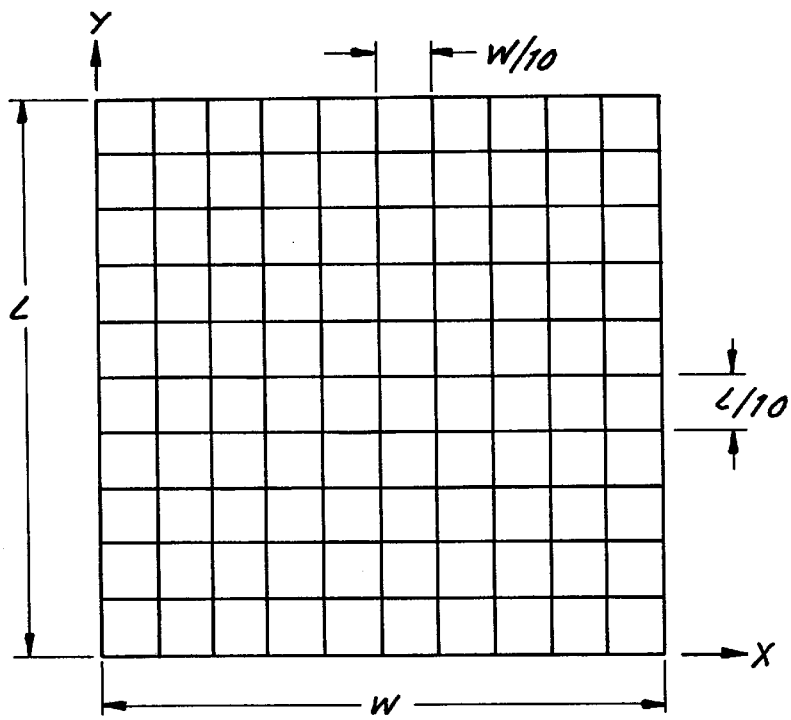
FIG. 12 illustrates a spatial cooridinate system.
Figure 13:
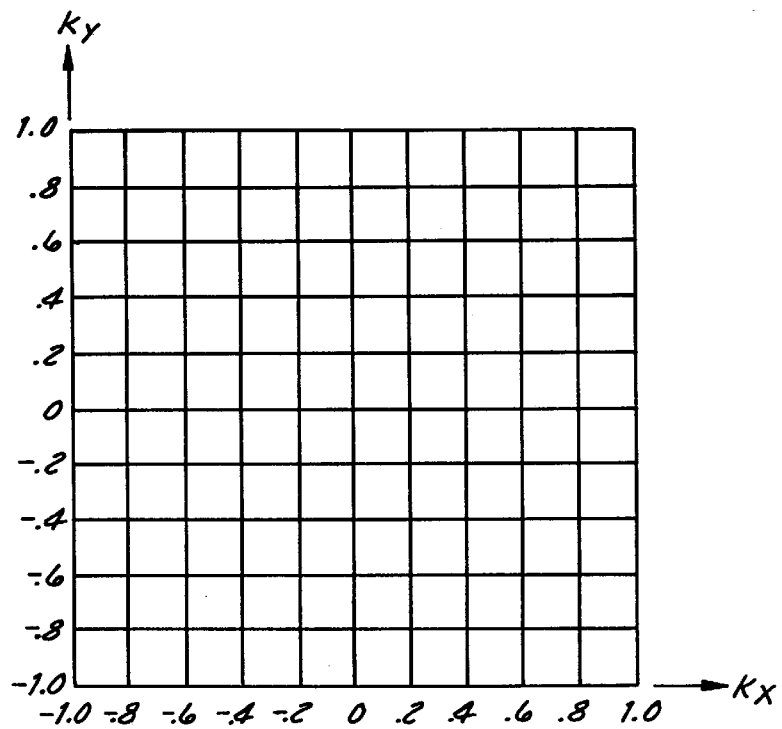
FIG. 13 illustrates a directional coordinate system associated with one of the cells of the spatial coordinate system of FIG. 12.

FIG. 12 illustrates the 10×10 spatial coordinate system, and FIG. 13 illustrates the directional coordinate system. It should be noted that each of the 10×10 elementary cells illustrated in FIG. 12 has its own $k_x k_y$ plot (FIG. 13).

In this example, it is assumed that the dimensions of the elementary cells are distributed equally over directional coordinates and over spatial coordinates. In other words, 10×10 cells are dedicated to directional coordinates, and 10×10 cells are dedicated to spatial coordinates. However, the manner in which cells are distributed between spatial coordinates and directional coordinates is flexible, and therefore a different distribution could be used. For example, the following distribution could be used: M=20×20×5×5 (i.e., 20×20 cells dedicated to directional coordinate space and 5×5 cells dedicated to spatial coordinate space). This would be done to increase accuracy in the directional coordinate system. The range between $k_x$=0.8 and $k_x$=1.0 represents a 37 degree difference, which may be too large in many circumstances.

Based on M=10×10×10×10, the phase-space elementary cell, $\Omega_o$, is $$\Omega_o = 0.2 \times 0.2 \text{ ster} \times 3 \text{ cm} \times 3 \text{ cm} \tag{5-6}$$

and the average number, <n> of rays, passing this elementary cell is $$\langle n \rangle = \frac{70,000 \text{ rays}}{10,000 \text{ cells}} = 7 \text{ rays/cell} \tag{5-7}$$

Therefore, the average flux per cell, $P_B$, is $$P_B = 7 \times 0.00231 \text{ lm/ray} = 0.02 \text{ lm} \tag{5-8}$$

and the average output luminance, <B>, is $$\langle B_I \rangle = \frac{0.02 \text{ lm}}{0.36 \text{ ster} \times \text{cm}^2} = \frac{0.02 \times 10^2 \text{ lm}}{0.36 \text{ ster} \times \text{cm}^2} = 555 \text{ Cd/m}^2 \tag{5-9}$$

and the luminance efficiency, x, is $$X = \frac{555}{39,000} = 1.5\%. \tag{5-10}$$

In this case the output is too dim and the viewing angle is unnecessarily large.

EXAMPLE II

In this example, the same parameters as in Example I are assumed. This time, however, output light is collimated in such a way that, on the average, it can be confined into an x-angle: $\alpha_x = \pm 11.5°$, and an identical y-angle: $\alpha_y = \pm 11.5°$. As a result, the number of occupied elementary cells is reduced by a 5×5=25-factor (since $\text{SIN}^{-1}$ (11.5)=0.2, light rays are only emitted from cells having $k_x$=−0.2, 0, or +0.2 and $k_y$=−0.2, 0, or +0.2), and the average output luminance is $$\langle B_{II} \rangle = 555 \times 25 = 13,875 \text{ Cd/m}^2. \tag{5-11}$$

In this case, the output is too bright and the viewing angle is too small.

EXAMPLE III

In this example, the same parameters as in Example I are assumed. This time, however, output light is collimated in such a way that, on the average, it can be confined into an x-angle: an x-angle: $\alpha_x = \pm 30°$, and an identical y-angle: $\alpha_y = \pm 30°$ $$\langle B_{III} \rangle = 555 \times 4 = 2220 \text{ Cd/m}^2 \tag{5-12}$$

which agrees with typical luminance values for laptop computer screens.

F. Utilization of Phase Space Coordinates to Generate Two-Dimensional Graphs

Figure 14A:
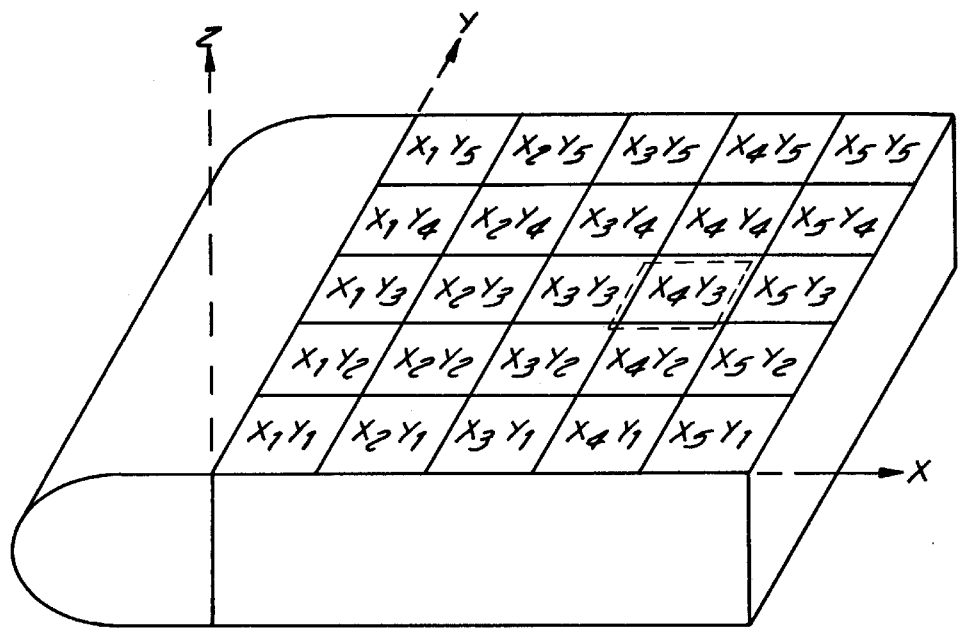
FIG. 14A illustrates a backlighting system having an output plane.
Figure 14B:
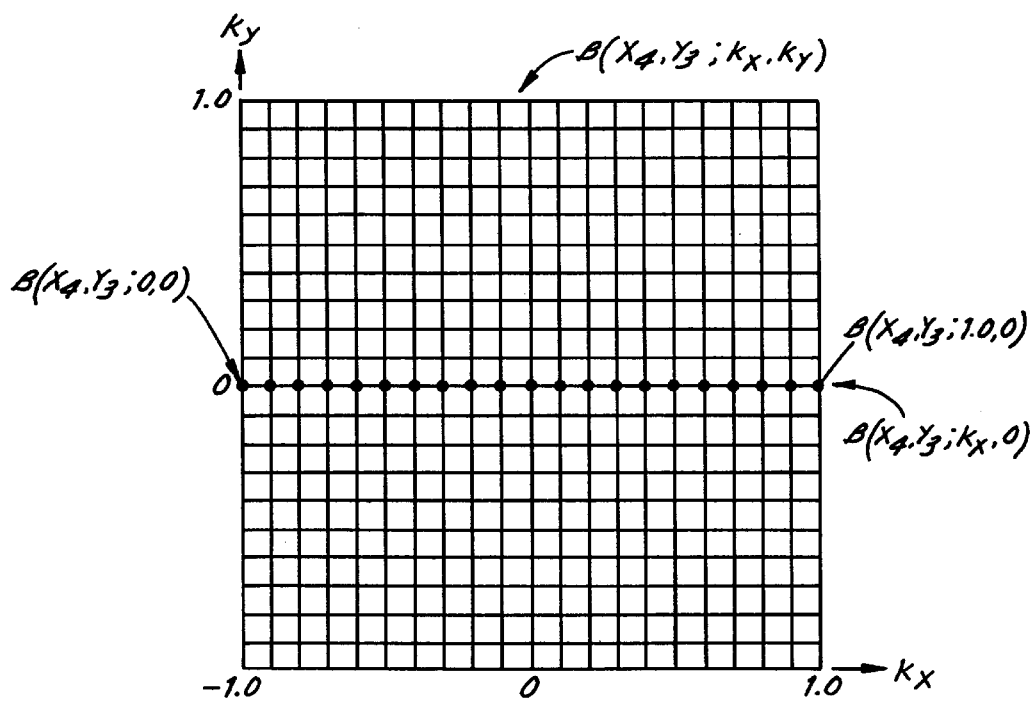
FIG. 14B illustrates directional coordinate space for a given cell of the backlighting system illustrated in FIG. 14A.
Figure 15:
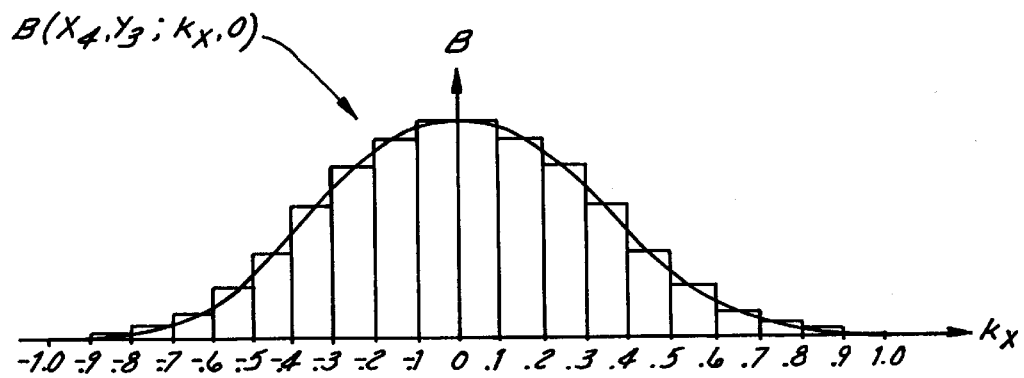
FIG. 15 is a graph of luminance values for the cell of FIG. 14B, in which one of the directional coordinates varied and the other is held constant.

Referring now to FIGS. 14A, 14B and 15, spatial and directional ray information organized according to the phase space coordinate system can be used to generate two-dimensional graphs which describe performance characteristics of a lighting system.

FIG. 14A illustrates a backlighting system having an output plane x,y. The phase space coordinate system for the backlighting system has been organized into a M=20×20× 5×5 coordinate system. Thus, the spatial coordinate space consumes 5×5 cells (i.e., the output plane x,y has been spatially divided into an output plane of 5×5=25 elementary cells, as illustrated), and the directional coordinate space consumes 20×20 elementary cells (not illustrated). A complete set of phase space coordinates B(x, y; $k_x$, $k_y$) for a set of ten thousand elementary cells has been obtained for the backlighting system. As described above, this information can be obtained through the use of conventional ray tracing programs (even though conventional ray tracing programs do not organize the information in terms of a phase space coordinate system). Assume it is desired to know the output characteristics of an exemplary cell $x_4 y_3$, for example, it is desired to know how luminance varies for different output directions α of rays exiting the cell $x_4 y_3$ (the angle α is defined with respect to the x-axis as described above, and it is the parameter $k_x$ which varies).

Referring to FIG. 14B, the directional coordinate space B($x_4, y_3$; $k_x, k_y$) for the exemplary cell $x_4 y_3$ is illustrated.

(The directional coordinate space $B(x_4,y_3; k_x,k_y)$ is only for the cell $x_4y_3$; however, each of the other cells $x_iy_j$ has an similar directional coordinate space $B(x_i,y_j; k_x,k_y)$. Since it is only desired to know how luminance varies for different output directions α (as opposed to different output directions α and β), only a two dimensional graph is required and the directional coordinate $k_y$ is held constant. For purposes of choosing a mid-range value, the value $k_y=0$ is chosen. The sequence of coordinates $B(x_4,y_3; k_x,0)$ for $k_x=$'1.0 to +1.0 is highlighted in FIG. 14B.

Referring to FIG. 15, a two dimensional graph of $B(x4,x_3; k_x,0)$ is illustrated. In this graph, the luminance values for each of the twenty values of $k_x$ are illustrated. The data points have also been interpolated to form a smooth curve.

FIG. 15 illustrates a cross section taken at the point $k_y=0$ of the variation in brightness as the parameter $k_x$ varies from −1.0 to +1.0. It can be seen that by creating similar graphs for each of the twenty different possible values of $k_y$, and then by combining these twenty graphs, a three dimensional graph of the variation in luminance as a function of $k_x$ and $k_y$ for the cell $x_4y_3$ could be obtained. Again, the data points could be interpolated to form a smooth surface. Similar two-dimensional and/or three-dimensional luminance graphs could be also be obtained for the remaining twenty four cells which define the output plane of the illustrated backlighting system.

To obtain photometric ray tracing information the following exemplary procedure may be used. First, catalog-type data is selected describing the source (e.g., geometry of the source, luminance, absorption constants, refractive indexes, geometry of microprisms, and so on). Next, a Lambertian distribution of rays is provided to the source surface by using the phase space formalism. Then, ray tracing rules are provided for each single ray using a computer program. Next, an input number of rays and number of output elementary cells is assumed in such a way that there are few rays per cell. Then, weight or power degradation per ray is computed. Next, a photometric data acquisition system is defined which converts phase space coordinates of output rays into cell locations. In other words, given a ray with output coordinates $(x_i, y_j; k_{xk}, k_{yl})$, the system assigns this ray to a particular elementary cell. Then, summary weights of rays for each cell are computed, thereby providing an amount of output power per elementary cell. Next, for a given cell, the total cell output power is divided by throughput of the cell (see Eq. (5-9)). The result of this division is average luminance for the given cell. Then, this procedure is repeated for all cells to obtain distribution of luminance per cell for a range of cells (see Eqs. (4-4A) and (4-4B)). For example, if there are 10,000 cells, then 10,000 values are obtained, each value representing output luminance luminas. Finally, the data is illustrated in the form of two-dimensional or three-dimensional graphs as desired, as described above.

G. Utilization of Phase Space Coordinates in Conjunction with Cost Functions

Spatial and directional ray information organized according to the phase space coordinate system can be used in conjunction with cost functions. For example, the following minimum mean squared error (MMSE) cost function may be used:

$$C = \Sigma |B_{MAXij} - B_{AVG}|^2$$

where $B_{MAX}(i,j)$ is the maximum output luminance for a given cell (x=i, y=j) for all values of $k_x$ and $k_y$, and $B_{AVG}$ is the average maximum output luminance for all of the cells. This function is used to obtain a uniform distribution of luminance across the output plane. If the output luminance is uniform, then $B_{MAX}(i,j)=B_{AVG}$ in all cases, and the output C of the cost function is equal to zero. If the output luminance is not entirely uniform, then the $B_{max}$ values are all not the same, the output of the cost function is non-zero. By minimizing the output C, a uniform output luminance may be obtained.

Figure 16:
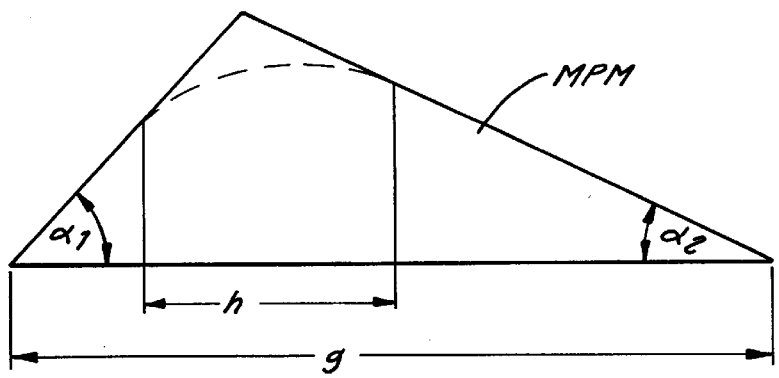
FIG. 16 illustrates a microprism of a light pipe having parameters which can be minimized using a cost function.

An example of parameters which could be optimized using the above cost function is illustrated in FIG. 16. FIG. 16 illustrates a microprism (groove) MPM of a light pipe. Ideally, the microprism is triangularly shaped. However, due to imperfections in manufacturing, one of the comers is rounded. The extent of this rounding is measured by a distance h relative to a distance g. The other two corners are measured by angles $\alpha_1$ and $\alpha_2$. By varying the parameters h, g, $\alpha_1$ and $\alpha_2$, and applying the above cost function, the performance of the light pipe may be optimized.

H. Photometric Ray Tracing and Some Physical Optics Phenomena Quasi-Homogeneous Sources Photometric ray tracing is applicable to geometrical-optics-related problems. However photometric ray tracing can also be applied in other ways, as such as areas where physical-optics-related phenomena are manifested in a soft way. In such a case, the ability to optical interference (and, diffraction) should be very weak; or, in other words, the spatial coherence of an optical source should be rather low, while optical intensity should by slowly-varying, in respect to wavelength. Such weak-spatial-coherence sources are called quasi-homogeneous sources [7]. They are very common in nature as well as in industry and include: all thermal sources, fluorescent sources, LEDs, the vast majority of semiconductor lasers, plasma sources, etc.

Non-Lambertian Diffusers

Figure 17:
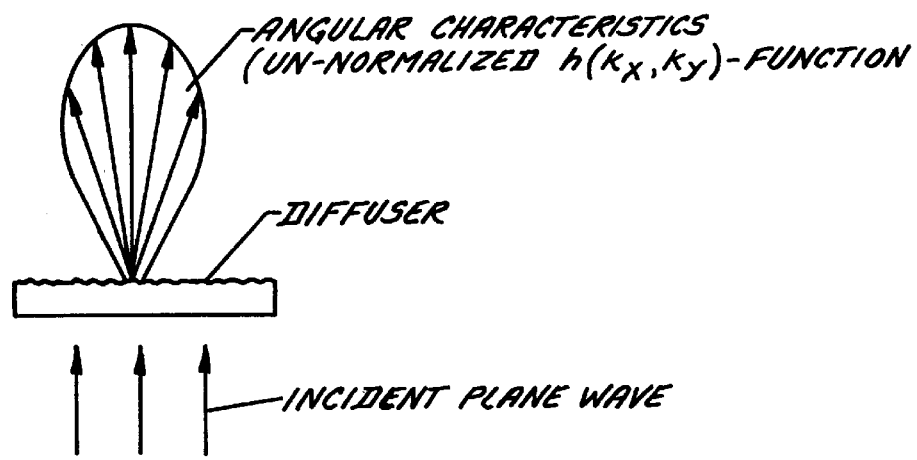
FIG. 17 illustrates angular characteristics of a non-Lambertian diffuser.

Referring to FIG. 17, non-Lambertian diffusers have different angular characteristics than those defined by the Lambert law. Non-Lambertian diffusers are used for scattering light. Thus, unlike other optical devices, which in some circumstances multiply the number of light rays by a factor of about two or three, non-Lambertian diffusers multiply the number of light rays by a factor of about one hundred.

Conventional ray tracing techniques can still be applied to non-Lambertian diffusers, in spite of this scattering effect. However, due to the drastically increased number of rays, the complexity of the ray tracing problem is drastically increased. For example, instead of tracing one million rays, it becomes necessary to trace one hundred million rays. This is, of course, more computationally time-consuming.

However, an alternative approach (described below) can also be used in certain situations, for example where the input plane of the diffuser is optically coupled to the output plane of a spatial light modulator, the spatial light modulator having an input plane which is coupled to the output plane of a light pipe, and the light pipe having an input coupled to the output of a light engine. Generally speaking, according to the alternative approach, ray tracing is performed from the light source to the output of the spatial light modulator. Integral equations are then applied to the output of the spatial light modulator. These equations incorporate information which is experimentally determined, and greatly increase the speed with which the lighting structure can be modeled because the need to perform ray tracing through the diffuser is avoided. To the extent that speed is increased, rapid prototyping is promoted.

The output luminance distribution (without diffuser) in the form: $B'(x,y; k_x,k_y)$ and the final luminance distribution (after passing diffuser) in the form $B(x,y; k_x,k_y)$ are considered. According to the homogeneous linear system theory [8], the relation between those two luminences is in the convolution form:

$$B(x,y;k_x,k_y) = \iint h(k_x-k_x',k_y-k_y')B'(x,y;k_x',k_y')dk_x'dk_y' \quad (6\text{-}1)$$

where $h(k_x,k_y)$ is the point response of the system, which, for homogeneous diffusers (discussed here), does not depend on position (x,y). Equation (6-1) relates output luminas of the diffuser to input luminas as a function of $h(k_x, k_y)$. The function $h(k_x, k_y)$ is experimentally determined. Thus, given input luminance to the diffuser, output luminance can be determined using Eq. (6-1).

The point response character of the function (h) can be easily verified by substituting into B'-luminance, the Dirac delta function distribution:

$$B'(x,y) = F(x,y)\delta(k_x,k_y) \quad (6\text{-}2)$$

where: $\delta(\ldots)$ is the Direc delta, and $F(x,y)$ is a smooth function. Substituting Eq. (6-2) into Eq. (6-1), the following relation is obtained:

$$B(x,y;k_x,k_y) = F(x,y)h(k_x,k_y) \quad (6\text{-}3)$$

Thus, the h-function is indeed the system point response. From the principle of energy conservation, for lossless diffusers (and, ignoring Fresnel loss) the equality of emittances yields the following relations:

$$E(x,y) = E'(x,y) \quad (6\text{-}4)$$

where $$E(x,y) = \iint B(x,y;k_x,k_y)dk_xdk_y \quad (6\text{-}5)$$

and $$E'(x,y) = \iint B'(x,y;k_x,k_y)dk_xdk_y \quad (6\text{-}6)$$

By substituting Eq. (6-1) into Eq. (6-5), and using Eq. (6-4) and Eq. (6-6), the following normalization relation is obtained:

$$\iint h(k_x-k_x',k_y-k_y')dk_xdk_y = \iint h(k_x,k_y)dk_xdk_y = 1 \quad (6\text{-}7)$$

Thus, the h-point function is normalized into unity. The equality holds due to the fact that the integration in Eq. (6-5) is limited to homogeneous variations, i.e., when: $k_x^1+k_y^2 \leq 1$. Therefore, the integration procedure can be expanded into infinity, and, thus, the shift of the argument ($k_x \rightarrow k_x - k_{x'}$) can be ignored.

As a point response in the angular space ($k_x,k_y$), the function $h(k_x,k_y)$ can be found experimentally by measurement of angular characteristics of a bean passing through a homogeneous diffuser, with incident plane wave, as shown in FIG. 17. This characteristic is normalized according to Eq. (6-7).

Spatial Coherence

For quasi-homogeneous sources, the source luminance has the following form:

$$B_0(\vec{r},\vec{p}) = 2(\omega^2/c)k_zI_0(\vec{r})\mu(\vec{p}/\lambda); k_z = \sqrt{1-p^2} = \cos\theta \quad (6\text{-}8)$$

where:

$$\vec{p}(k_x,k_y); p = \sqrt{k_x^2+k_y^2}; k_z = \sqrt{1-p^2} = \cos\theta; \vec{r} = (x,y), \quad (6\text{-}9)$$

$I_0$ is optical intensity, $\omega$ angular frequency, c is the speed of light in a vacuum, and $\mu$ is the 2-D Fourier transform of the complex degree of spatial coherence, $\mu(\vec{r})$, in the form:

$$\bar{\mu}(\vec{p}/\lambda) = \int_{-\infty}^{+\infty}\mu(\vec{r})\exp[-i2\pi(\vec{p}/\lambda)\vec{r}]d^2r \quad (6\text{-}10)$$

where $d^2r = dxdy$. By comparison of Eq. (6-8) with ruminant intensity definition, the following relation is obtained:

$$J(\vec{p}) \sim k_z1B(\vec{p}) \sim k_z^2 \, \bar{m}(\vec{p}/\lambda) \quad (6\text{-}11)$$

For example, if B=constant (the Lambert law), then, according to Eq. (6-9), J~cos θ, and B~1/cos θ. In general, if B~$\cos^n\theta$, then J~$\cos^{(n+1)}\theta$, $\mu$~$\cos^{(n+1)}\theta$, as summarized in Table 2.

TABLE 2

Exemplary Angular Characteristics for Luminance (B) Luminant Intensity (J) and Fourier Transform of Complex Degree of Coherence ($\mu$)

| Type of Source | B | J | $\mu$ |
|---|---|---|---|
| Lambertian | 1 | cos θ | 1/cos θ |
| Intensity-Uniform | 1/cos θ | 1 | 1/$\cos^2$ θ |
| General cos θ | $\cos^n$ θ | $\cos^{(n+1)}$ θ | $\cos^{(n-1)}$ θ |

While typical light sources are Lambertian ones, typical illumination surfaces are non-Lambertian, since their angular characteristics are more narrow than Lambertian ones.

As a result, their spatial coherence radius is usually higher than λ. The Heisenberg uncertainty principle for conjugate dispersion coefficients (ρ and Δρ) demonstrates this:

$$\rho \times \Delta p \sim \lambda \quad (6\text{-}12)$$

where ρ is the spatial coherence radius. For Δp=1 (non-coherent case), ρ~λ is obtained; i.e., the spatial coherence radius is equal to wavelength. Consider, in general, more narrow beams, i.e., $$\Delta\rho = \epsilon/1; \epsilon \geq 1 \quad (6\text{-}13)$$

Then, according to Eq. (6-10), we have:

$$\rho = \epsilon\lambda \quad (6\text{-}14)$$

i.e., narrow beams have higher spatial coherence, since, then, ρ>λ.

II. Rapid Prototyping Through Three Dimensional Visualization of Ray Tracing Output For purposes of rapid prototyping, it is important to eliminate any unwanted artifacts by way of computer modelling, rather than have such artifacts appear in a fabricated lighting system. Once computer modelling is complete, the design process should be complete. The design process should not include a fabrication step, because the process of fabricating a single prototype is both time consuming and expensive (on the order of $50,000). Preferably, the only fabrication step is be the step of fabricating a lighting system to be sold to a customer.

Figure 18:
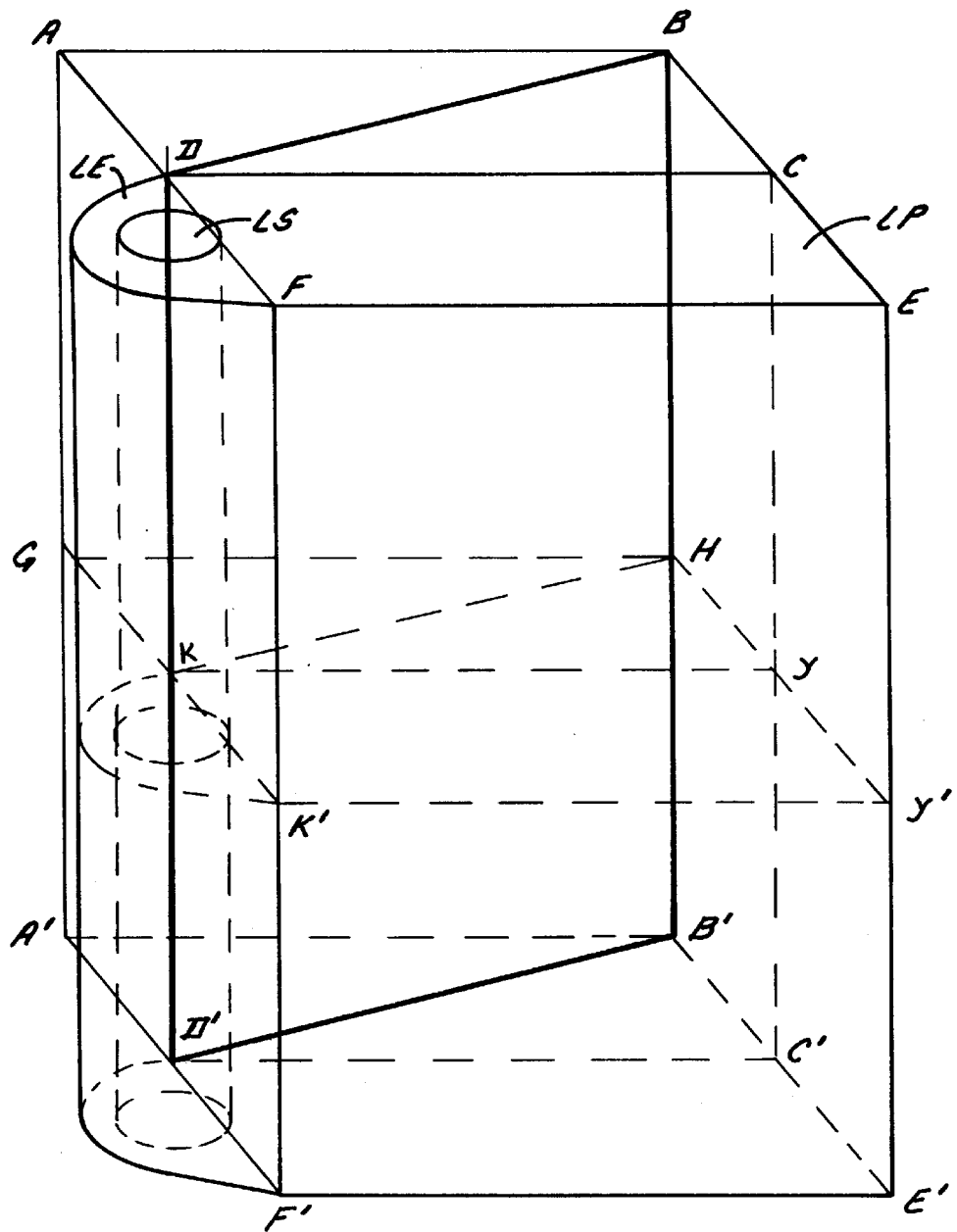
FIGS. 18 and 19 illustrate an example of an unwanted artifact.
Figure 19:
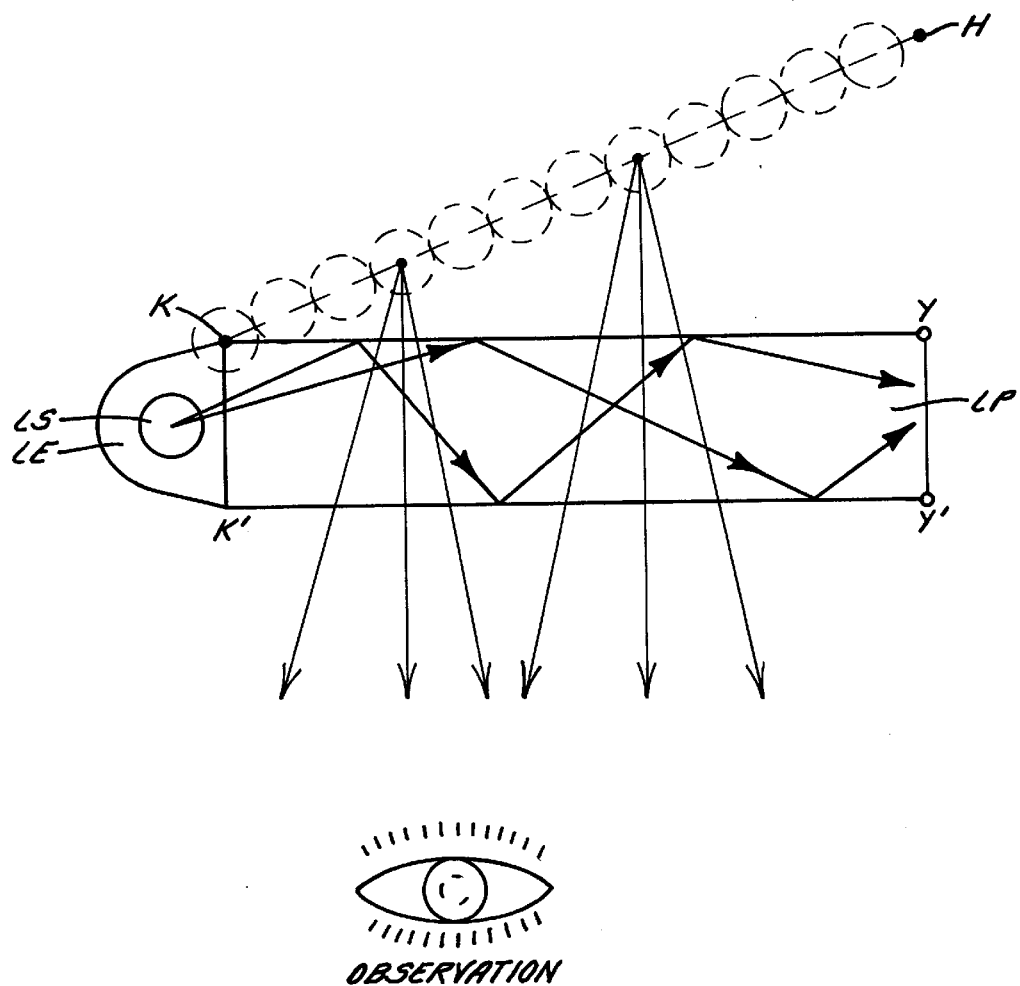

Referring now to FIGS. 18 and 19, an example of an unwanted artifact is illustrated. FIG. 18 illustrates a backlighting system which is physically bounded by the surface C-D-E-F-C'-D'-E'-F'. The output plane of the backlighting system ("screen") is defined by the plane E-F-E'-F'. A microprism structure (not illustrated) which is disposed on the plane C-D-C'-D' reflects light rays from the light engine LE comprising a cylindrical source having a luminance of about 40,000 $Cd/m^2$. The light rays are directed toward the output plane E-F-E'-F' which is, for example, used in conjunction with the screen of a lap top computer. The microprism structure creates the optical illusion that the light source extends to the plane A-B-A'-B', and thereby creates a virtual space bounded by the surface A-B-C-D-A'-B'-C'-D'.

Within the virtual space is a virtual slanted plane B-D-B'-D' which is visible to a user through the output plane E-F-E'-F'. This focal plane is an unwanted image artifact. The artifact is slanted because the microprisms are spaced closer together on the left side than on the right side of the plane C-D-C'-D'.

FIG. 19 illustrates an arbitrary cross sectional plane K-y-K'-y' of the lighting system illustrated in FIG. 18. A series of virtual light sources (caused by the multireflection effect of the microprism structure) extends from the point K to the point H. The virtual sources create a focal line which combines with other focal lines to create a focal plane, i.e., the image artifact. Experimentally, the existence of the image artifact can be verified by marking a black ring on the light source LS, which causes a corresponding segment on the plane B-D-B'-D' to be blackened.

The artifacts such as illustrated in FIGS. 18 and 19 are difficult to detect without having a three-dimensional view of the light structure. Of course, one way to obtain such a view is to fabricate a prototype of the lighting structure. However, this approach is unacceptable in the context of rapid prototyping for the reasons described above. Instead, it is preferred that such artifacts be detected through computer modelling of the lighting structure. Specifically, it is preferred that a computer be used to present a three-dimensional rendering of the lighting structure which reveals such artifacts.

In order to perform this three-dimensional visualization using automatic computer tools, there should be photometric ray tracing in three dimensions. Of interest during this process are focal points, caustics (focal lines), and focal planes/surfaces, which ray tracing can be used to find. These are the boundaries of the image artifacts.

However, the photometric ray tracing described above is based on a cross section of rays passing through a given two-dimensional (x,y) plane. Thus, in order to provide a three-dimensional visualization, it is necessary to generate a plurality of the two-dimensional cross sections (planes).

In order to produce the plurality of two-dimensional cross sections, a plurality of z-planes must be chosen in conjunction with photometric ray tracing. The parameters (x, y; $k_x$, $k_y$) characterize a set of rays passing through a given z-plane, and thus these parameters depend on which z-plane is chosen. However, the image artifact is usually only visible from a limited range of perspectives and, a priori, it is impossible to know which z-plane to choose in order to produce the unwanted image artifact.

The following approach is used which overcomes this difficulty. First, the virtual space is divided into cubics. Then, each cubic is sliced in parallel fashion and photometric ray tracing is performed for each slice. Then these steps are repeated for all the different possible observation points, each orientation being defined by the z-axis. It should be noted that, ordinarily, the lighting structure would only be viewed from a limited viewing range, e.g., normal plus or minus 30°. Thus, it is not necessary to perform these steps for the entire 360°; rather, it is only necessary to do so for the limited viewing range, e.g., 60°. Next, the individual monoscopic orientations are regrouped in pairs so as to provide stereoscopic views (a view being a pair of monoscopic orientations organized in a stereoscopic way). Then, only those stereoscopic views having high luminance values are selected in order to eliminate optical noise. This could be done using a threshold level, e.g., all views having a luminance value below three nits (nit=$cd/m^2$) are discarded. (The assumption here is that any artifact would have a luminance value above three nits.) All of these steps can be done automatically by a computer.

The previous direct method of applying photometric ray tracing to produce a three-dimensional visualization can also be replaced by a tomographic approach. This approach is based on the fact that there is an a priori assumption of some existence of focal planes (or more generally focal surfaces) and combining this a priori information with the geometric locii of visual ray cross sections.

Once the data is gathered, it is presented to the individual designing the lighting system. Advantageously, the data is presented in the form of stereoscopic views, i.e., three dimensional renderings of the lighting system. The data is thus presented in a format which is easily comprehended by human cognition. Compared with providing the individual with raw data about the spatial and directional coordinates of all the rays propagating through the light structure, this presentational format is less general and contains less information (because it depicts the lighting structure from only a specific viewpoint). However, the information is presented in a format which is more easily understood and which is therefore more useful. This presentational format enables the data to be viewed in the same way that the actual lighting structure is viewed, i.e., one angle at a time.

There are a variety of conventional computer graphics techniques available for displaying the data in three-dimensional format. According to this direct approach, each cube defines a local fragment of a local surface. A connectivity operation may be employed, such as the marching cubes method[9]. As a result, after finishing the connectivity operation, a focal or caustic surface is obtained which represents the unwanted visual artifacts to be eliminated by proper design of the lighting system. Other conventional volume rendering methods could also be used.[9]

Figure 20:
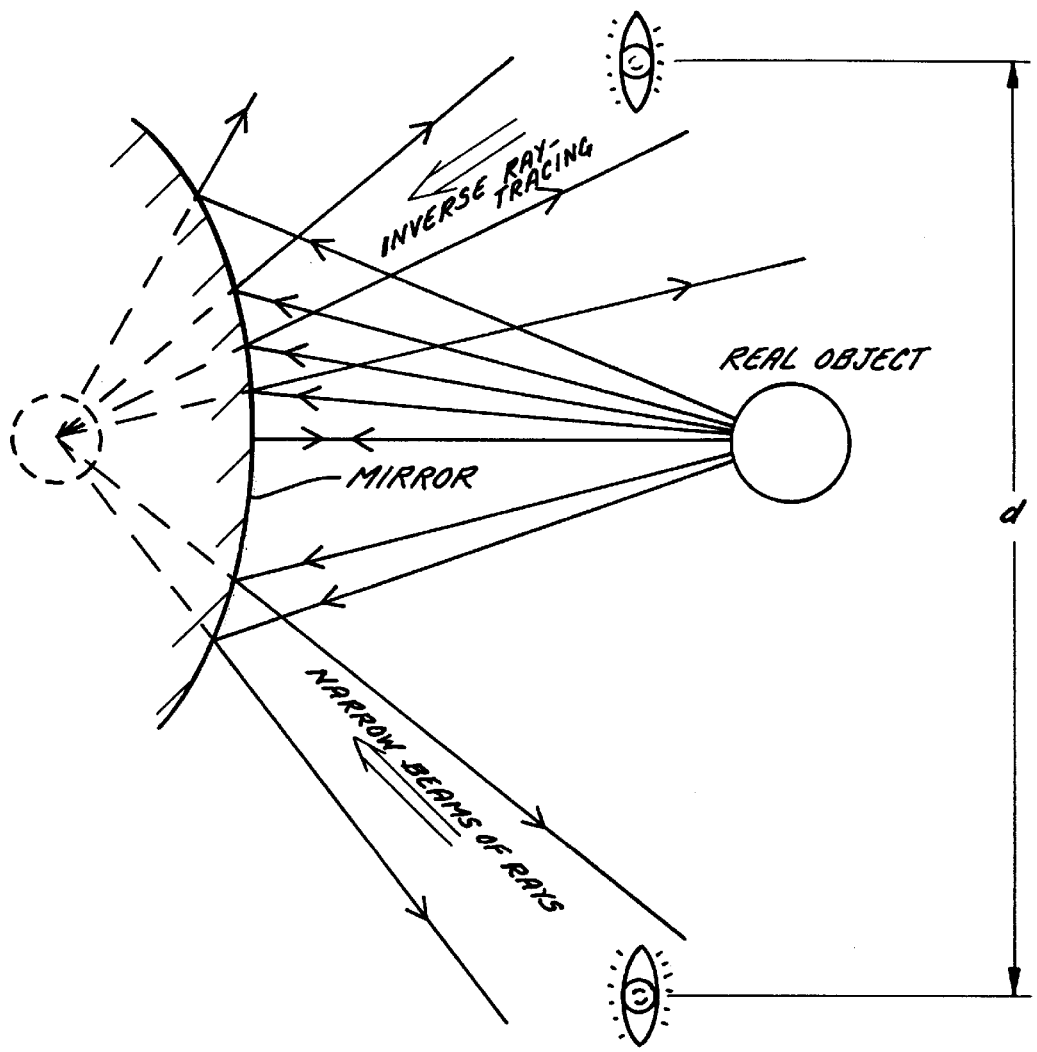
FIG. 20 illustrates a reverse ray tracing in which rays are traced from a viewer's eye to a light source.

Referring now to FIG. 20, in order to further reduce computation time, the present invention utilizes reverse ray tracing. Conceivably, the ray tracing data described above could be gathered by tracing the rays from the light source and determining their combined output power at the output plane of the lighting system. Instead, however, rays are traced from one of the viewer's eyes to the lighting structure and back to the light source (reverse ray tracing).

Reverse ray tracing is preferred because it is more computationally efficient, and therefore reduces computation time and promotes rapid prototyping. According to reverse ray tracing, it is assumed that a person is viewing the light structure from a given perspective. Rays are traced from one of the viewer's eyes to the lighting structure and back to the light source. The data obtained is eventually combined with data obtained by repeating the same process for the other eye, so that a three-dimensional view is obtained. This is more computationally efficient because, if it is assumed that the person is looking at the lighting structure, then a very high percentage of the rays which are traced will provide useful information. This is because the purpose of the light pipe is to direct light from the light source. Thus, when the eye is looking at the light pipe, the probability is very high that rays emitted from the eye will hit the light source.

In contrast, if ray tracing begins at the light source, the vast majority of the rays will not reach the viewer's eye. Therefore, when reverse ray tracing is not used, computation time is wasted tracing rays which do not reach the viewer's eye.

To perform reverse ray tracing, the first step is to trace a set of rays exiting from the eye as if the light source began at the focal point of the eye. The field of view of the eye is restricted to the light pipe. The rays then propagate covering the field of view of the eye and, when they strike the surface of the light pipe, they are governed by the same ray tracing laws/formulas which govern ray tracing which starts at the light source. The formulas which govern ray tracing are valid regardless whether the ray tracing is performed in forward or reverse directions. Thus, the phase space techniques described above apply equally in reverse.

Figure 21:
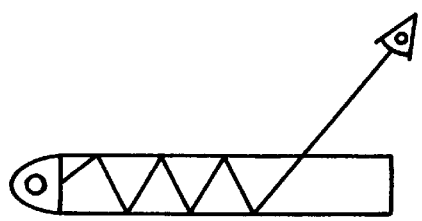
FIG. 21 illustrates a reverse ray tracing of a light pipe.

The rays from the eye are traced back through the light pipe. If the ray hits the light source, then it is considered a valid ray. Then, it is determined what percentage of the light beam is reflected at each reflection so that the power of the light beam can be determined. With reference to FIG. 21, a ray is traced from the eye to the surface of the light structure. The ray then incurs several reflections as it travels towards a luminaire. The luminaire models the light engine LE. (Since the light engine LE is a complicated structure, it is modeled up to the interface with the light pipe. This model is the luminaire and is formed by a set of spatial and directional information defining the light emitted from the light engine LE.) Additionally, the amount of power lost at each reflection for each ray is known. Thus, the luminaire gives the power of the ray initially, and then the power of the ray at the output plane of the light structure can be determined by working backwards from the luminaire taking the loss at each reflection into account. Thus, the luminance of the ray striking the eye is known. This can be combined with information about other rays in order to form an image of the light structure.

Using the above-described approach, a sequence of three-dimensional renderings of a lighting system can be provided in a relatively short amount of computational time. By way of example, a cube size which is small is selected (on the order of 1 mm$^3$) in order to allow a surface which is not a plane to be viewed. The virtual image space has exemplary dimensions 10 cm×10 cm×10 cm, and a 1 mm cubic is used, so that there are $10^6$ cubics. Ten slices per cube are taken for each orientation. The viewing range is 30°, and one thousand orientations are taken within the 30° range. One hundred rays per slice are used. As a result, there are one thousand points per cube per orientation, so that $10^{12}$ data points must be determined in order to present the three-dimensional rendering. If a high speed computer is used (one which is able to process on the order of $10^{10}$ operations per second), the computation time is on the order of minutes. Advantageously, therefore, a full range of stereoscopic views within a 30° range can be produced within minutes using the present invention.

The preferred three dimensional visualization process therefore promotes rapid prototyping not only because it permits detection and elimination of hidden artifacts, but also because it is implemented in a manner which is computationally efficient.

III. Rapid Prototyping Through Computer Architecture Which Performs Ray Tracing The amount of time required for computer modeling of a lighting system can also be decreased through the use of a computer architecture such as that described below. Generally speaking, the process of modeling a lighting system involves a computing load comprising a set of different though homogeneous tasks. The homogeneous tasks are, for example, the tasks of tracing individual rays through the lighting system in order to arrive at B(x,y; $k_x,k_y$) data points. There is an extremely large number of these tasks (on the order of ten thousand to ten million). However, these tasks are independent of each other, in the sense that the path of one light ray does not affect the path of another light ray.

Figure 22:
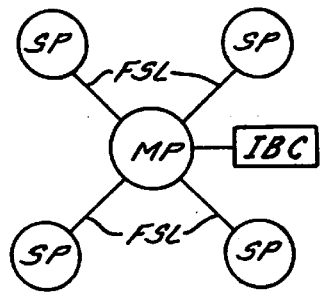
FIG. 22 illustrates a computer architecture which is used for ray tracing.

The present invention provides a computer architecture which is especially well adapted for handling this type of computing load which is associated with the rapid prototyping of a lighting structure. Referring to FIG. 22, a computer system comprises a master processor MP connected to a plurality of slave processors SP by way of a plurality of fast serial links FSL. The master processor MP and the plurality of slave processors SP are connected together in the form of a star network.

According to this architecture, a large task requiring a large amount of time if performed by a single processor is broken down by the master processor MP into numerous homogeneous subtasks which can be performed by the plurality of slave processors SP. Because the task is distributed to the plurality of slave processors SP, the task is performed much faster than if performed by only a single processor. (It should be noted that although only four slave processors are illustrated, many more slave processors could also be used.) Because the task is performed much faster by the plurality of slave processors SP, the amount of time required to model a lighting structure is reduced, and therefore rapid prototyping is promoted.

Figure 23:
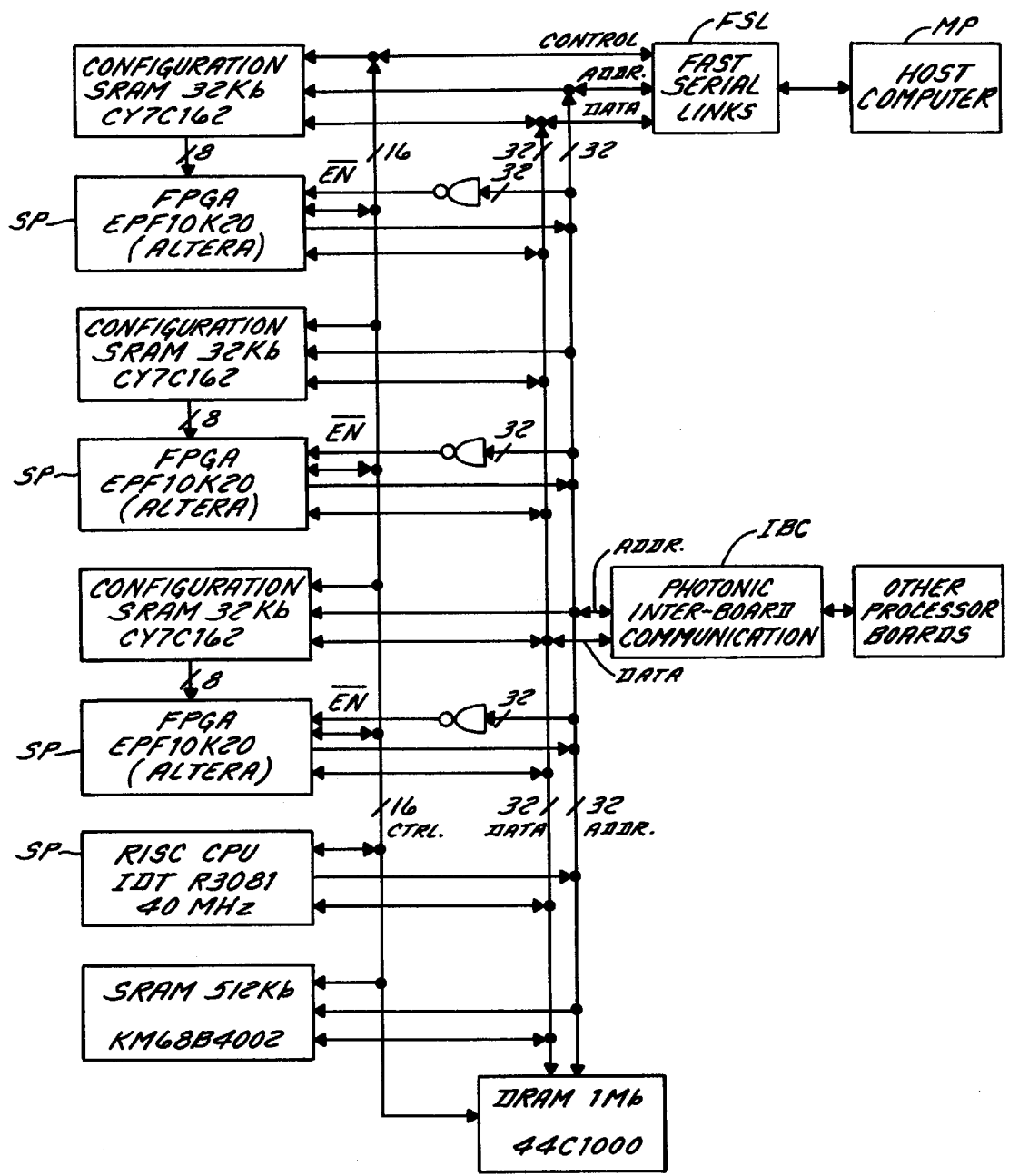
FIG. 23 illustrates the computer architecture of FIG. 22 in greater detail.

Referring to FIG. 23, the computer system of FIG. 22 is illustrated in greater detail. The master processor is a host processor MP. The host computer MP is networked to the plurality of slave processors SP, which are a plurality of field programmable gate array (FPGA) processors. The network is a star network and, more specifically, is a SIMD (single instruction, multiple data path) type of star network. Instructions are only given by the master processor, and there are multiple data paths.

The FPGA processors each are disposed on a common multi-chip module which is linked to the host processor MP by way of the plurality of fast serial links FSL. The FPGA processors are considered to be networked since they are each connected to the host computer MP. However, since the FPGA processors are disposed on the same physical board, the network has a different physical structure than, for example, a network formed by a plurality of desktop computers.

In order to increase computation power, it is possible to add as many additional slave processors as needed. For example, the photonic interboard communication IBC can be used to network a plurality of additional FPGA boards with the host processor MP. As a result, numerous boards comprising a plurality of slave processors SP can be stacked one on top of the other. (Ultimately, the number of boards which can be stacked on top of each other is limited primarily by cost constraints; at some point, the cost of adding another FPGA board outweighs the benefits of doing so.)

The host processor MP stores all of the data (e.g., the x,y; $k_x,k_y$ parameters). Using the fast serial links FSL, which operate at a speed of about 100 MB per second, the host processor MP distributes data needed for computing to the individual slave processors. The host processor MP controls the distribution of data and tasks and the collecting of results and the display of the results.

The FPGA processors SP are linked directly to the host computer MP and do not communicate with each other. As previously described, this arrangement corresponds to the types of tasks that the slave processors handle. For example, each FPGA processor can be used to trace the path of a ray through a lighting structure. However, since the ray paths are not dependent on each other, there is no need for the FPGA processors SP to communicate with each other. The host processor MP has all the information needed by the FPGA processors SP. Therefore, it is possible for the master processor to distribute data to the FPGA processors SP, and then collect the results from the slave processors after the FPGA processors SP are done computing.

There are a limited number of different tasks which the FPGA processors SP perform. At any given time, two of the FPGA processors SP are not necessarily performing the same type of task. In general, however, the FPGA processors SP are performing the same limited number of tasks over and over as called upon to do by the host processor MP. The FPGA processors SP are configured in advance so as to enable them to perform the specific tasks which they will be called upon by the host processor MP to perform.

Each of the FPGA processors SP is associated with 32 KB of static random access memory (SRAM). The SRAM contains the instructions from the master processor, and also functions as cache memory. There is also a one megabyte dynamic random access memory (DRAM) which stores data obtained from the host processor MP.

The described architecture provides unexpected results. First, not all of the tasks are identically hard, and therefore the output data stream is not laminar. For example, if a first ray is not reflected before exiting the light pipe, and a second ray is reflected a half a dozen times, the task of computing the path of the second ray is much harder than the task of computing the path of the first ray. However, because the paths of individual rays may be computed independently of each other, it turns out that the non-laminar output data stream does not prevent networking in the manner described.

Additionally, the use of individual slave processors creates extra work for the master processor. Specifically, the master computer has to allocate tasks, collect results, and combine the results into a whole. It has been found, however, that networking the slave processors with a master processor nevertheless drastically reduces the amount of time required to model a lighting system.

IV. Exemplary Light Pipe
A. Light Pipe Structure and Operation

Figure 24A:
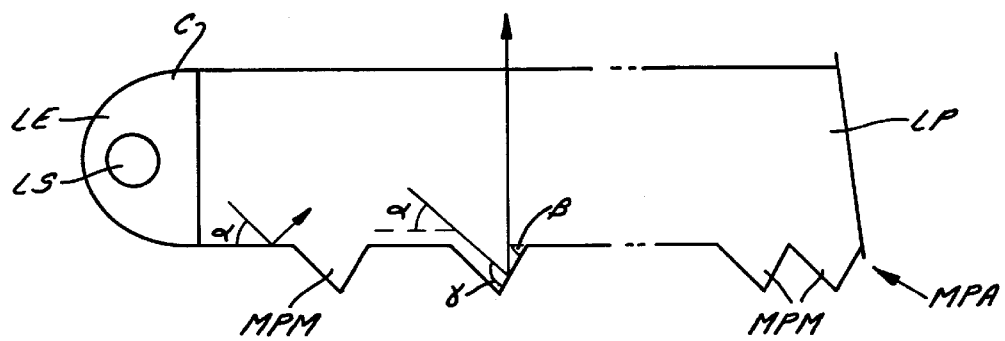
FIGS. 24–26 illustrate a backlighting system having a light pipe with an exaggerated microprism array.
Figure 24B:
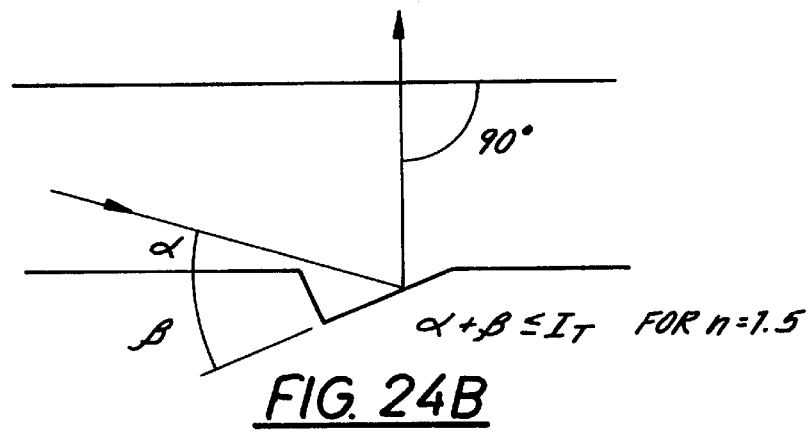
Figure 25:
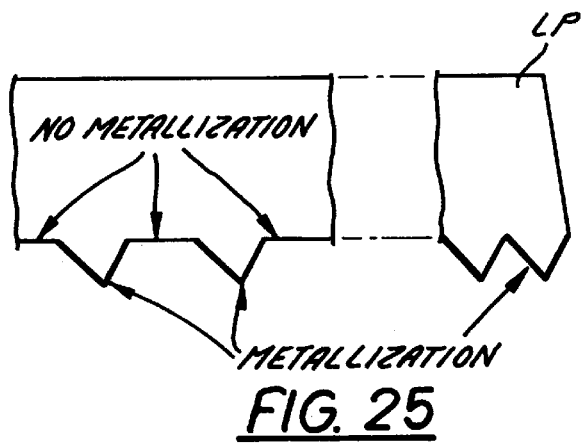
Figure 26:
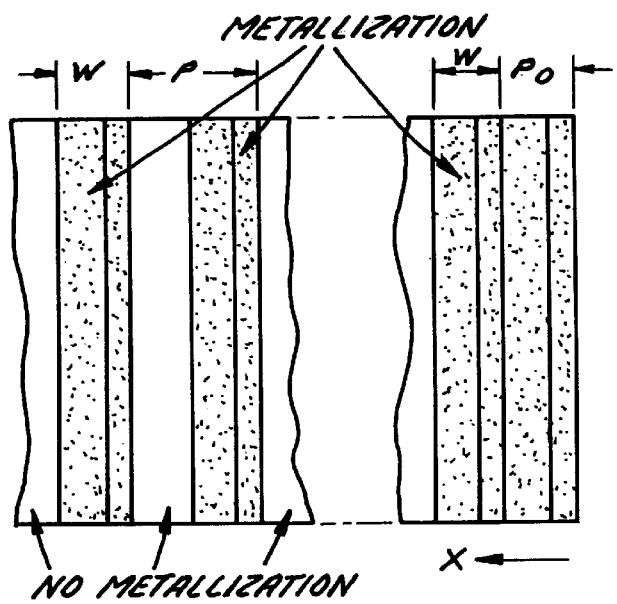

Referring to FIGS. 24–26, a backlighting system having a light pipe LP with an exaggerated microprism array MPA is illustrated. As previously mentioned, backlighting systems are known for providing backlighting for various applications such as laptop computers.

As illustrated, the backlighting system comprises a light source LS, the light pipe LP, and an output plane. The light pipe LP includes a microprism array MPA which, for purposes of illustration, has been exaggerated. The purpose of the light pipe LP, and more specifically of the microprisms, is to reflect light emitted from the light source LS towards the output plane of the light pipe LP. The microprisms MPM are spaced such that some light rays are always directed upwards while some light rays are allowed to continue to propagate through the light pipe LP.

Ideally, light is directed upward with a uniform brightness. To this end, the spacing between the microprisms MPM is not uniform. The microprisms MPM are less densely distributed at the near end of the light pipe LP (so that a lesser percentage of a greater amount of light is redirected upward) and are more densely distributed toward the far end of the light pipe LP (so that a greater percentage of a lesser amount of light is redirected upward). At the far end of the light pipe LP, the duty cycle of the microprisms approaches one hundred percent. In any event, it should be clear that, with each reflection, light is either directed toward the output plane of the light pipe LP or, alternatively, continues to propagate towards the far end of the light pipe LP.

In the past, there have been two types of light pipes, namely, metallized and non-metallized. In a non-metallized light pipe, there is no metal placed on the bottom surface of the light pipe. The advantage of not metallizing the bottom surface of the light pipe is that it results in total internal reflection. Total internal reflection is desirable because there are no losses and no absorption; the light pipe is 100% reflective. Thus, as light propagates through a non-metallized light pipe, all of the light is reflected (assuming the incidence angle at the reflection surface is below a critical angle) and none of the light is absorbed at the reflection surface.

The disadvantage of not metallizing the bottom surface of the light pipe is that it restricts the geometry of the microprism structure. Specifically, in order for light to be reflected in the vertically upward direction, the following conditions must hold true: $\beta=45°-\alpha/2$ (where $\beta$ and $\alpha$ are defined as illustrated in FIG. 24) and $\alpha+\beta \leq I_T$ (where $I_T$ is the critical angle for total internal reflection). If $\beta$ is not in this range, then a portion of the light which is incident on the surface of the microprism structure may be transmitted rather than reflected.

The other type of light pipe is metallized light pipes. In the case of metallized light pipes, the bottom surface of the microprism array is metallized. This prevents transmission of light at the surface of the microprism array. As a result, $\beta$ can assume any value, and there will not be any transmission of light.

The disadvantage of metallized light pipes, however, is that the metallization absorbs light, and therefore there is no longer total internal reflection. Rather, the metal absorbs about 15% of the light. Thus, there is a certain amount of loss in power each time a light ray is reflected as it propagates toward the far end of the light pipe. Any absorption losses due to metallization will be on the order of 15–20% for each reflection. Thus, if a 15% loss is assumed, and if light is reflected three times before exiting, the light ray will have only approximately 60% of its original power upon exiting the light pipe. To reduce the amount of absorption, it is possible to reduce the thickness of the metal. However, in this case, transmission increases, so reducing the thickness of the metal does not satisfactorily address the problem.

In order to overcome these problems, the present invention provides a light pipe LP in which propagation of light is governed by total internal reflection and redirection of light by the microprisms MPM is governed by metallization. As illustrated in FIG. 24, and as more clearly illustrated in FIGS. 25 and 26, the light pipe LP has only the microprisms MPM metallized, and the spaces between the microprism arrays MPA are not metallized. The spaces between the microprisms MPM are what cause the light to propagate towards the far end of the light pipe LP. Light hits the surfaces numerous times before it reaches the far end of the light pipe LP. However, because these surfaces are not metallized, there is total internal reflection without any losses. Although the microprisms MPM are metallized, light only reflects from a microprism surface once before exiting. Thus, although there is a certain amount of loss associated with reflection from the surface of a microprism, this type of reflection only occurs once and therefore the loss is acceptable. Advantageously, therefore, the inventive light pipe LP combines the best features of metallized and non-metallized light pipes.

There are at least three ways to make this partially metallized structure. First, a mask can be applied which covers the spaces between the grooves and which leaves the grooves open for metallization. This is done using a photolithography technique. Specifically, photoresist is deposited to the entire bottom surface. Then, the photoresist is exposed with a master mask which leaves only the spaces exposed. Then, after the photoresist is developed, the photoresist between the grooves remains. Then the entire structure is metallized, including the photoresist. The metal thus covers the photoresist and the grooves. When the remainder of the photoresist is removed with the metal thereon, the surfaces between the grooves become non-metallized.

Second, a mask can be applied which covers the spaces between the grooves and which leaves the grooves open for metallization. In this respect, the second way is the same as the first. In this case, however, a metal foil mask is produced which covers the spaces between the grooves and which keeps open the grooves. The mask is applied to the groove structure and the metallization is done. When the surface of the light pipe LP is heated, the metal penetrates and the metallization is formed.

Third, directional evaporation or, more preferably, oblique evaporation is used in which the shadowing effect created by the grooves is utilized. According to this approach, a source of metal vapor is directed towards the grooves from one side. Since the metal is directed at an angle, the grooves create a shadow. The surface within this shadow, which is the surface between the grooves, is not covered by the metal vapor as it impacts the surface of the light pipe LP.

B. Characterization of Light Pipe With Photometric Ray Tracing

Figure 27:
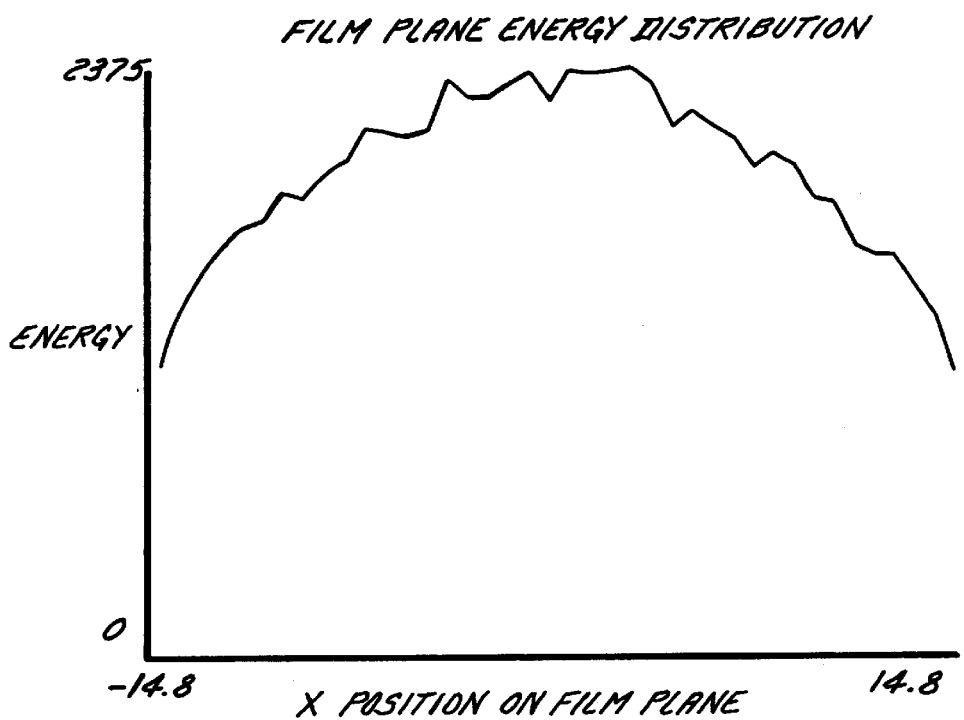
FIGS. 27–29 are a plurality of graphs of output power over a range of positions on the output plane of the light pipe illustrated in FIGS. 24–26.
Figure 28:
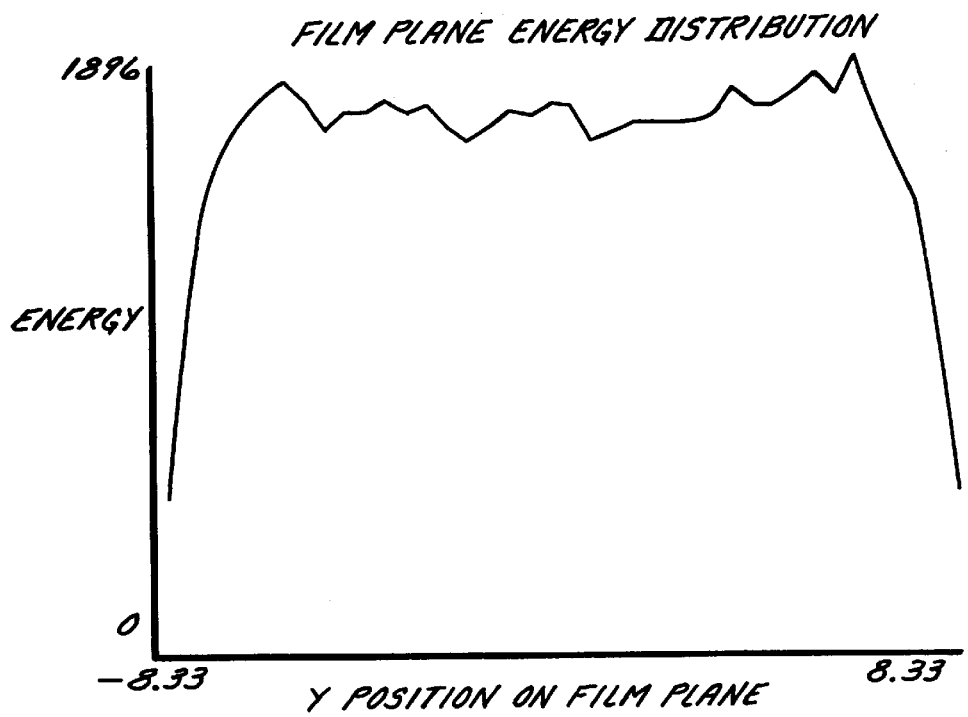
Figure 29:
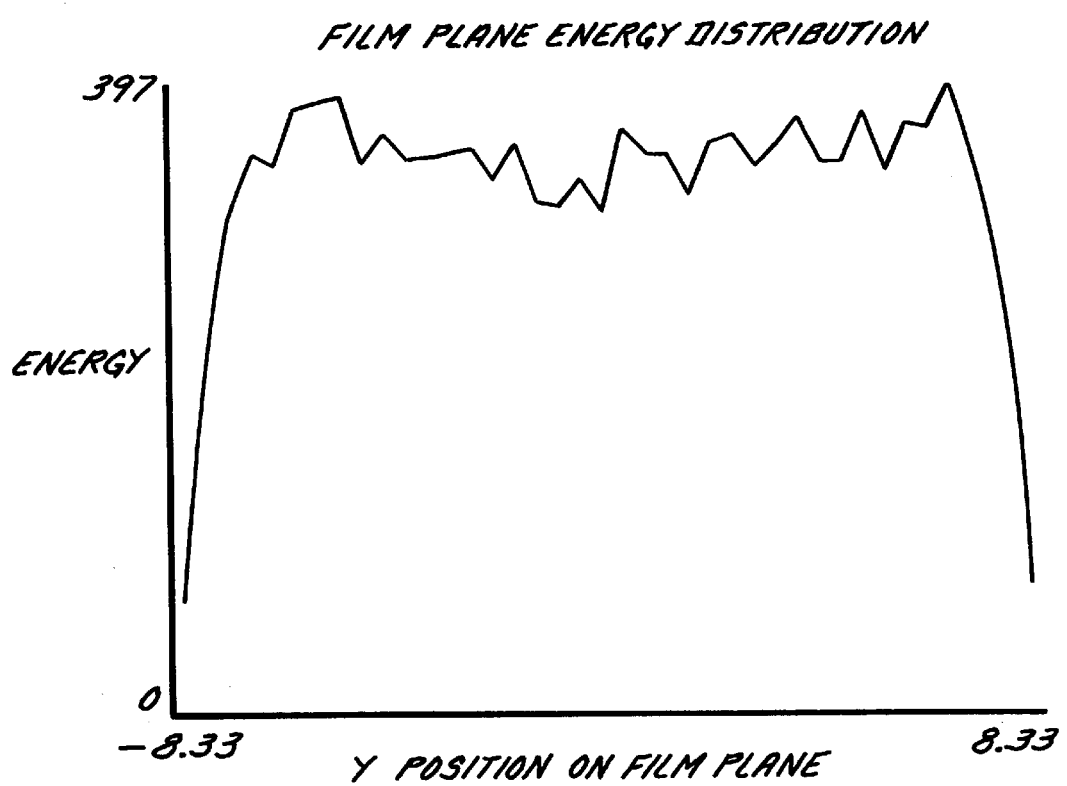

Referring to FIGS. 27–29, a plurality of graphs are illustrated which show the output power over a range of x and y positions on the output plane of the light pipe LP illustrated in FIGS. 24–26. These graphs were produced in accordance with the general method described in Section I(F).

FIG. 27 illustrates the output power taken at various points along the x-axis. FIG. 28 illustrates the output power taken at various points along the y-axis. FIG. 29 is similar to FIG. 28, except that a different distribution of elementary cells is utilized. In FIG. 28, only ten elementary cells were used in for the y-axis whereas, in FIG. 29, forty elementary cells were used. For this reason, FIG. 29 contains a higher density of data points and therefore appears more jagged.

Many changes and modifications may be made to the present invention without departing from the spirit thereof. The scope of these and other changes will become apparent from the appended claims.

References

1. T. Jannson, "Radiance Transfer Function," JOSA 70, 1544–1549 (1980).
2. T. Jannson and I. Tengara, "Radiometric Ray Tracing," in Proc. of the 10th Symposium on Energy Engineering, (Argonne National Laboratory, Argonne, Ill., 1992), pp. 241–250.
3. T. Jannson, T. Aye, I. Tengara, D. A. Ervin, "Second-Order Radiometric Ray Tracing," JOSA A 13, 1448–1455 (1996).
4. D. Marcuse, *Light Transmission Optics*, Academic Press, 1974.
5. W. T. Welford, R. Winston, *The Optics of Nonimaging Concentrators*, Academic Press, 1974.
6. T. Jannson, R. Winston, "Liouville's Theorem and Concentrator Optics," JOSA A, 3, 7–8 (1986).
7. Electro-Optics Handbook, Section 3, Radiant Sources, Burle Industries, Inc.
8. J. W. Goodman, *Introduction to Fourier Optics*, McGraw Hill, 1974.
9. W. Schroeder, K. Martin, B. Lorenson, *Visualization Tool Kit—An Object Oriented Approach to 3-D Graphics*, 148–55, 208–11, Prentice Hall, 1996.

We claim:

1. A method of prototyping a lighting system which is at least one of multiaxial and multifaceted, the method comprising:

modelling said lighting system, including determining output power of said lighting system by calculating phase space density, said phase space density being the density of a phase space defined by first and second spatial coordinates that define the spatial points of intersection of a plurality of light rays with a plane of said lighting system, and by first and second directional coordinates that define an angle of intersection of a particular one of said plurality of light rays with said plane of said lighting system.

2. A method of prototyping a lighting system which is at least one of multiaxial and multifaceted, the method comprising:

(A) modelling said lighting system by describing paths of a plurality of light rays which pass through a plane of said lighting system, said modelling step including ray tracing said lighting system by tracing paths of said plurality of light rays through said lighting system, and defining each of said plurality of rays in terms of phase space coordinates which define a phase space coordinate system based on said ray tracing step, said phase space coordinates including first and second spatial coordinates which define the spatial point of intersection of a particular ray with said plane and first and second directional coordinates which define an angle of intersection of said particular ray with said plane; and wherein said ray tracing step and said defining step in combination comprise (1) describing a light engine of said lighting system with optical parameters, including the step of providing a Lambertian distribution of rays at an output plane of said light engine, (2) providing ray tracing rules for each of said plurality of rays, (3) defining a plurality of elementary cells, (4) assigning a weight to each of said plurality of rays, (5) assigning each of said plurality of rays to a particular elementary cell, said elementary cell being one of said plurality of elementary cells, (6) computing an output amount of power per elementary cell, (7) dividing total cell output power for a particular elementary cell by throughput to obtain average luminas for said particular cell, and (8) repeating said dividing step for all of said plurality of elementary cells to obtain a distribution of luminas per cell; and (B) displaying data which describes output characteristics of said lighting system, said displaying step being performed based on said dividing and repeating steps.

3. A method of prototyping a lighting system which is at least one of multiaxial and multifaceted, the method comprising:

(A) modelling said lighting system by describing paths of a plurality of light rays which pass through a plane of said lighting system, said modelling step including (1) ray tracing said lighting system by tracing paths of said plurality of light rays through said lighting system, and (2) defining each of said plurality of rays in terms of phase space coordinates which define a phase space coordinate system based on said ray tracing step, said phase space coordinates including first and second spatial coordinates which define the spatial point of intersection of a particular ray with said plane and first and second directional coordinates which define an angle of intersection of said particular ray with said plane; and (B) applying a cost function to data representative of performance characteristics of said lighting system based on said modelling step, said cost function being a minimum mean squared error cost function, said cost function comparing average maximum luminance for all of said plurality of elementary cells with maximum luminance for a particular elementary cell, and application of said cost function maximizing microprism parameters of said lighting system; and (C) displaying data representative of performance characteristics of said lighting system based on said modelling step.

4. A method of prototyping a lighting system which is at least one of multiaxial and multifaceted, said lighting system including a non-Lambertian diffuser having an input plane and an output plane, the method comprising:

(A) modelling said lighting system by describing paths of a plurality of light rays which pass through a plane of said lighting system, said modelling step being performed for a portion of said lighting system which is adjacent said input plane of said non-Lambertian diffuser, said modelling step including (1) ray tracing said lighting system by tracing paths of said plurality of light rays through said lighting system, and (2) defining each of said plurality of rays in terms of phase space coordinates which define a phase space coordinate system based on said ray tracing step, said phase space coordinates including first and second spatial coordinates which define the spatial point of intersection of a particular ray with said plane and first and second directional coordinates which define an angle of intersection of said particular ray with said plane;

(C) experimentally determining a point response which relates output luminance of said non-Lambertian diffuser to input luminance of said non-Lambertian diffuser;

(D) determining output luminance of said non-Lambertian diffuser based on said point response and based on said modelling step; and (E) displaying data representative of performance characteristics of said lighting system based on said modelling step.

5. A method of prototyping a lighting system, comprising:

(A) ray tracing said lighting system;

(B) determining photometric quantities which describe said lighting system based on said ray tracing step;

(C) generating a plurality of two-dimensional cross sections of said lighting system;

(D) combining said plurality of two-dimensional cross sections to provide a first monoscopic rendering of said lighting system;

(E) repeating said generating step (A) and said combining step (B) to provide a second monoscopic rendering of said lighting system;

(F) combining said first and second monoscopic renderings to provide a stereoscopic rendering of said lighting system; and (G) displaying said stereoscopic three-dimensional rendering of said lighting system.

6. A method according to claim 5, further comprising the step of repeating said steps (A)–(D) a plurality of times to provide a plurality of additional stereoscopic renderings from a variety of angles.

7. A method of prototyping a lighting system comprising:

modelling said lighting system by describing paths of a plurality of light rays which pass through a plane of said lighting system, said modelling step being performed by a computer system having a plurality of slave processors networked to a master processor, said slave processors performing substantially homogeneous independent tasks, said modelling step including ray tracing said lighting system by tracing paths of said plurality of light rays through said lighting system, said ray tracing step being performed by said slave processors in cooperation with said master processor, and defining each of said plurality of rays in terms of phase space coordinates which define a phase space coordinate system based on said ray tracing step, said phase space coordinates including first and second spatial coordinates which define the spatial point of intersection of a particular ray with said plane and first and second directional coordinates which define an angle of intersection of said particular ray with said plane; and determining photometric quantities which describe said lighting system based on said modelling step; and displaying a stereoscopic three-dimensional rendering of said lighting system based on said determining step, said three-dimensional rendering including an image artifact.

8. A method according to claim 7, wherein said ray tracing step and said defining step in combination comprise describing a light engine of said lighting system with optical parameters, including the step of providing a Lambertian distribution of rays at an output plane of said source;

providing ray tracing rules for each of said plurality of rays;

defining a plurality of elementary cells;

assigning a weight to each of said plurality of rays;

assigning each of said plurality of rays to a particular elementary cell, said elementary cell being one of said plurality of elementary cells;

computing an output amount of power per elementary cell;

dividing total cell output power for a particular elementary cell by throughput to obtain average luminas for said particular cell;

repeating steps dividing step for all of said plurality of elementary cells to obtain a distribution of luminas per cell.

9. A method according to claim 8, wherein the number of elementary cells is on the order of ten thousand and the number of rays is on the order of one million.

10. A method according to claim 7, wherein said lighting system includes a non-Lambertian diffuser having an input plane and an output plane, wherein said modelling step is performed for a portion of said lighting system which is adjacent said input plane of said non-Lambertian diffuser, and further comprising experimentally determining a point response which relates output luminas of said non-Lambertian diffuser to input luminas of said non-Lambertian diffuser;

determining output luminance of said non-Lambertian diffuser based on said point response and based on said modelling step.

11. A method according to claim 7, further comprising

A. generating a plurality of two-dimensional cross sections of said lighting system;

B. combining said plurality of two-dimensional cross sections to provide a first monoscopic rendering of said lighting system;

C. repeating said generating step (A) and said combining step (B) to provide a second monoscopic rendering of said lighting system; and D. combining said first and second monoscopic renderings to provide said stereoscopic rendering of said lighting system.

12. A method according to claim 11, further comprising repeating said steps (A)–(D) a plurality of times to provide a plurality of additional stereoscopic renderings from a variety of angles.

13. A method according to claim 11, wherein during said ray tracing step, paths of light rays are traced from a hypothetical viewer's eye to a light source of said lighting system.

14. A method according to claim 7, wherein said slave processors are all disposed on a single multi-chip module board, wherein said multi-chip module includes an interboard communication link, said interboard communication link permitting a plurality of additional slave processors to be networked with said master processor, and wherein each of said slave processors comprises a field programmable gate array processor.

15. A method according to claim 7, wherein said slave processors are coupled to said master processor in the form of a single instruction multi data path type of star network.

16. A light pipe manufactured using the prototyping method of claim 7.

17. A method of prototyping a lighting system which is at least one of multiaxial and multifaceted, the method comprising:

modelling said lighting system, including determining output power of said lighting system based on the equation $$P = \int\int\int\int B(x,y;k_x,k_y)dxdydk_xdk_y$$

where P is said output power of said lighting system, $B(x, y; k_x, k_y)$ is equal to phase space density, x and y are spatial coordinates that define the spatial point of intersection of a particular ray with a plane of said lighting system, and $k_x$ and $k_y$ are directional coordinates that define an angle of intersection of said particular ray with said plane of said lighting system.

* * * * *